(12) United States Patent
Epstein et al.

(10) Patent No.: US 8,579,492 B2
(45) Date of Patent: Nov. 12, 2013

(54) OPTICAL FILM HAVING MICROREPLICATED STRUCTURES AND METHODS

(75) Inventors: Kenneth A. Epstein, St. Paul, MN (US); Richard F. Griffith, Minneapolis, MN (US); Alan B. Campbell, Santa Rosa, CA (US)

(73) Assignee: 3M Innovative Properties Company, St. Paul, MN (US)

(*) Notice: Subject to any disclaimer, the term of this patent is extended or adjusted under 35 U.S.C. 154(b) by 1345 days.

(21) Appl. No.: 11/927,202

(22) Filed: Oct. 29, 2007

(65) Prior Publication Data
US 2008/0049341 A1    Feb. 28, 2008

Related U.S. Application Data

(63) Continuation of application No. 10/877,341, filed on Jun. 25, 2004, which is a continuation of application No. 10/205,160, filed on Jul. 25, 2002, now abandoned, which is a continuation-in-part of application No. 09/922,438, filed on Aug. 3, 2001, now abandoned.

(51) Int. Cl.
*F21V 7/04* (2006.01)
*G02F 1/1335* (2006.01)

(52) U.S. Cl.
USPC ............................................ 362/626; 349/62

(58) Field of Classification Search
USPC .......... 359/546, 529, 530, 834; 362/620, 626; 349/62
See application file for complete search history.

(56) References Cited

U.S. PATENT DOCUMENTS

| | | | |
|---|---|---|---|
| 4,127,693 A | 11/1978 | Lemelson | |
| 4,241,980 A | 12/1980 | Mihalakis et al. | |
| 4,298,249 A | 11/1981 | Gloor et al. | |
| 4,486,070 A | 12/1984 | Benton | |
| 4,991,940 A | 2/1991 | Dalisa et al. | |
| 5,128,787 A | 7/1992 | Blonder | |
| 5,975,706 A * | 11/1999 | Nakayama | 359/530 |
| 6,067,137 A | 5/2000 | Ohnishi et al. | |
| 6,264,336 B1 | 7/2001 | Epstein et al. | |
| 6,540,367 B1 * | 4/2003 | Benson et al. | 359/530 |
| 6,704,077 B1 | 3/2004 | Yoshida et al. | |
| 6,894,746 B1 | 5/2005 | Manabe et al. | |
| 2003/0016539 A1 | 1/2003 | Minano et al. | |

FOREIGN PATENT DOCUMENTS

| | | |
|---|---|---|
| JP | 11/142622 | 5/1999 |
| JP | 2000-066013 | 3/2000 |
| JP | 2000-147504 | 5/2000 |
| JP | 2000-162710 | 6/2000 |
| JP | 2000-180612 | 6/2000 |
| JP | 2001-083308 | 3/2001 |
| JP | 2001-133614 | 5/2001 |
| JP | 01-311910 | 11/2001 |
| JP | 04-274217 | 9/2004 |
| JP | 11-038213 | 2/2011 |

* cited by examiner

*Primary Examiner* — Alessandro Amari
(74) *Attorney, Agent, or Firm* — Robert S. Moshrefzadeh

(57) ABSTRACT

An optical film for use in transparent displays, such as reflective LCDs. The optical film has three-dimensional, prismatic structures that reflect incoming light. The prismatic structures are configured so that the reflecting facets orient the reflected light in desired reflective light pattern. The pattern shape and intensity can be controlled by the shape and dimensions of the various reflecting facets. In one embodiment, the height of the prismatic structure varies along two dimensions of the structure.

3 Claims, 29 Drawing Sheets

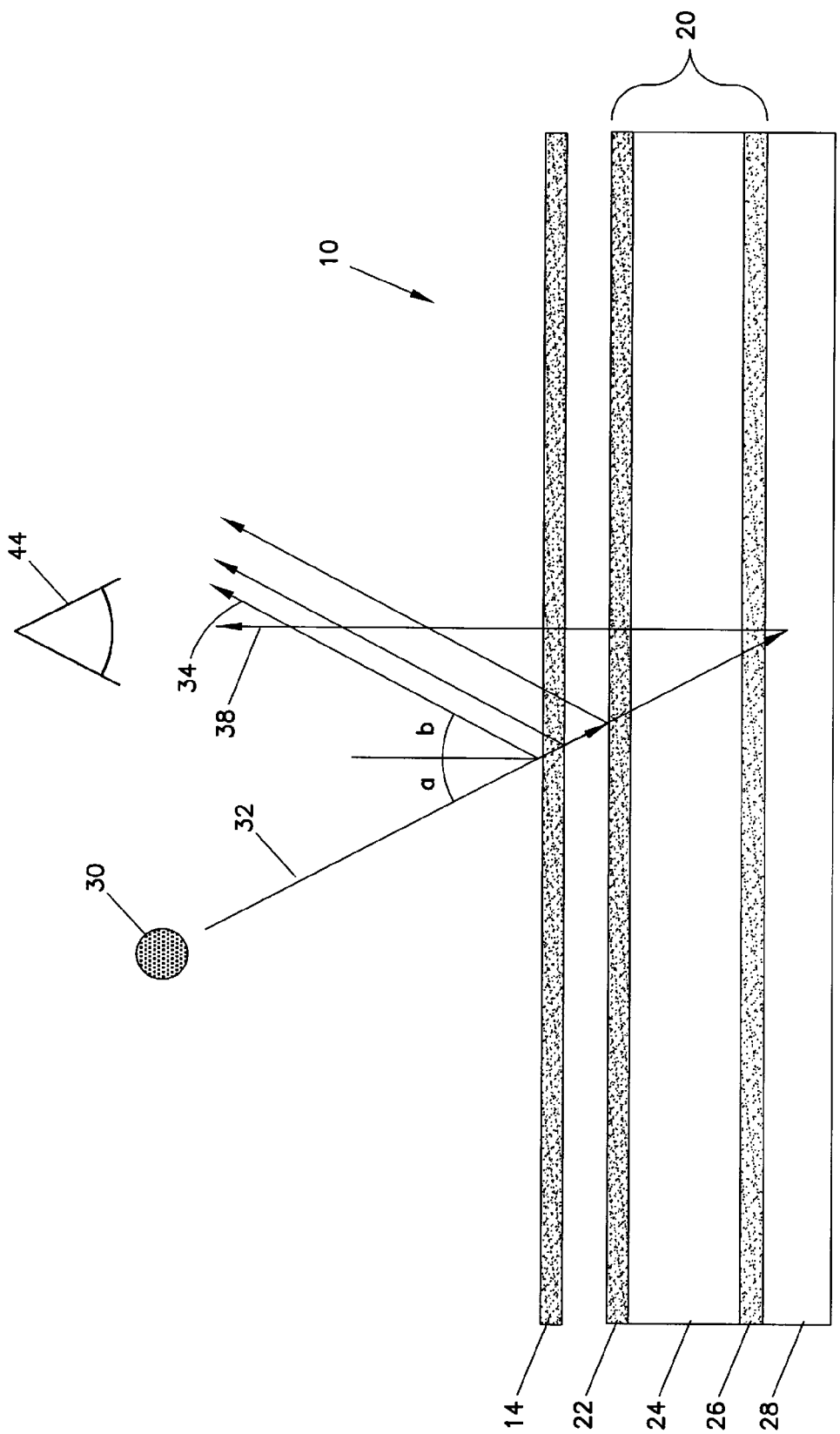

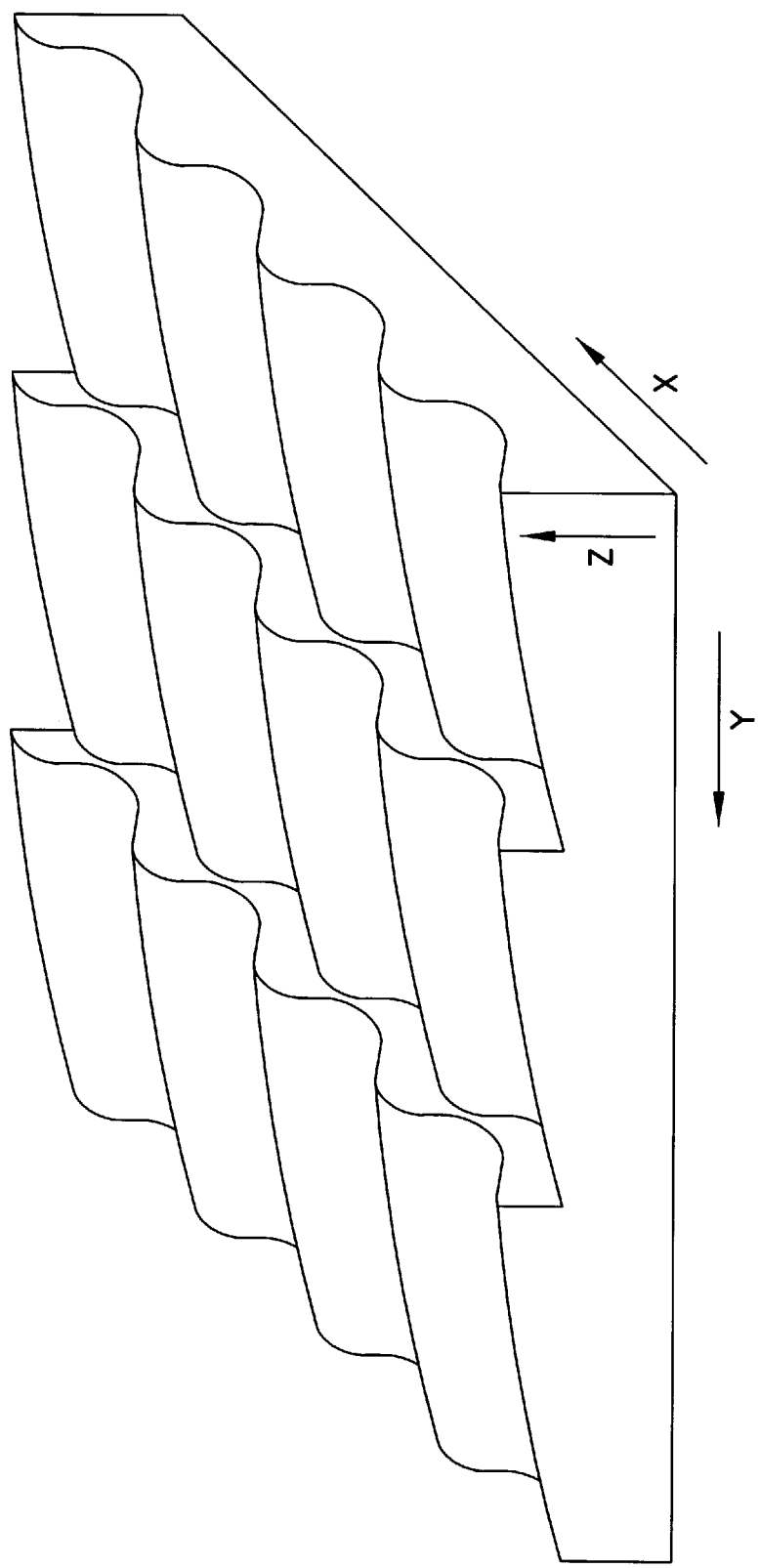

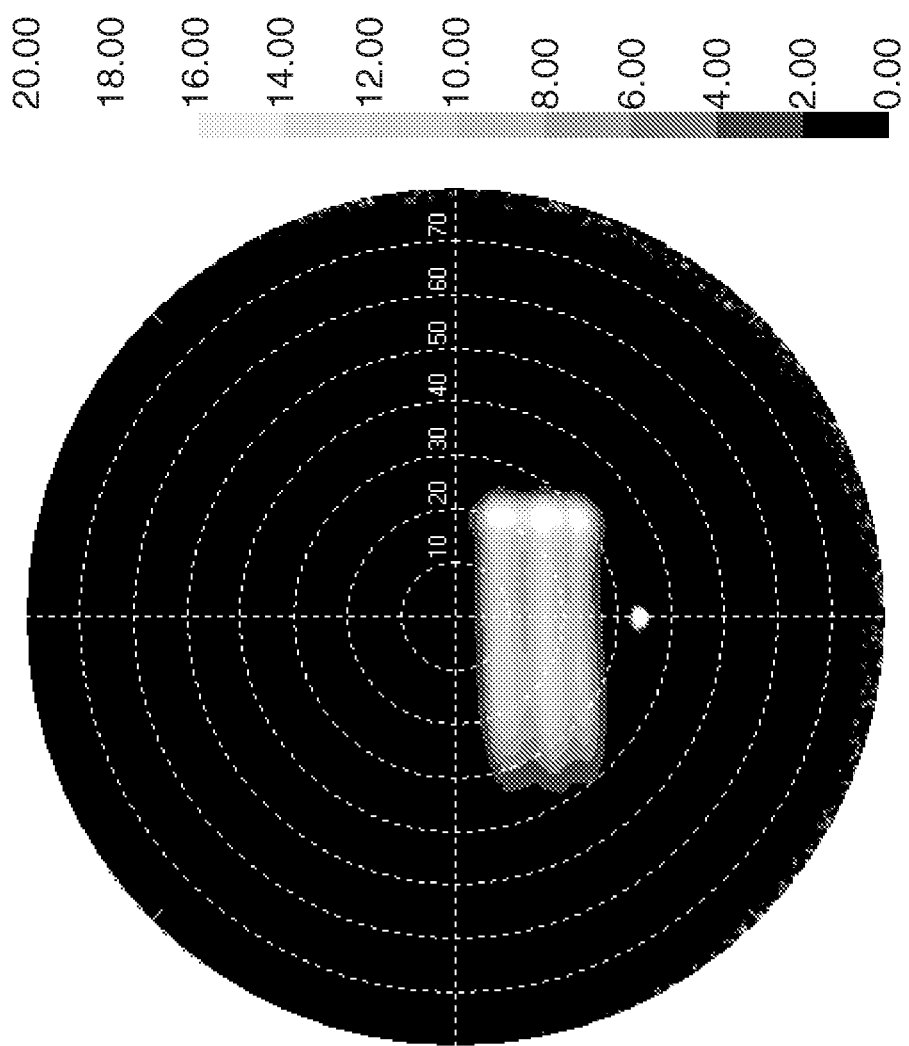

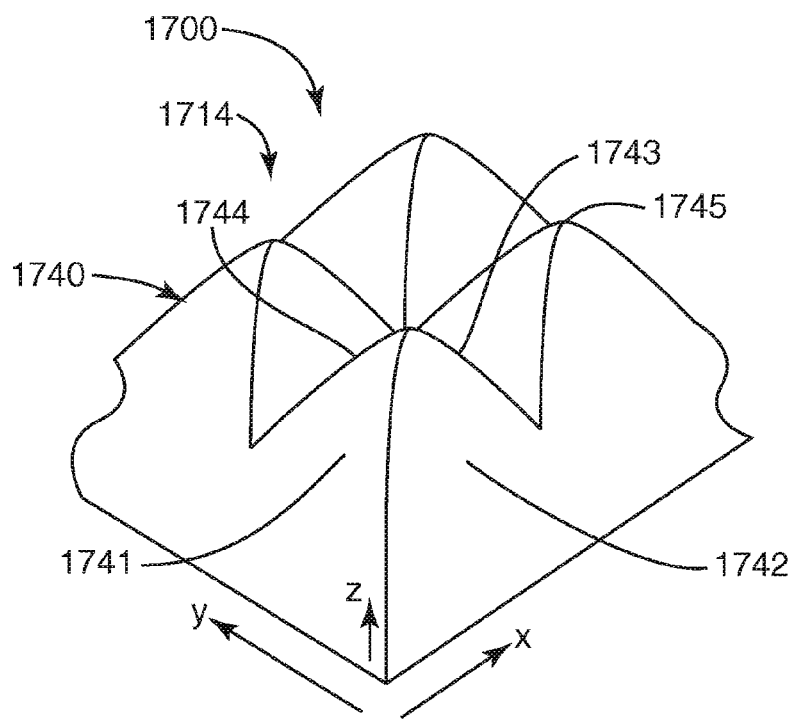
Fig. 30A
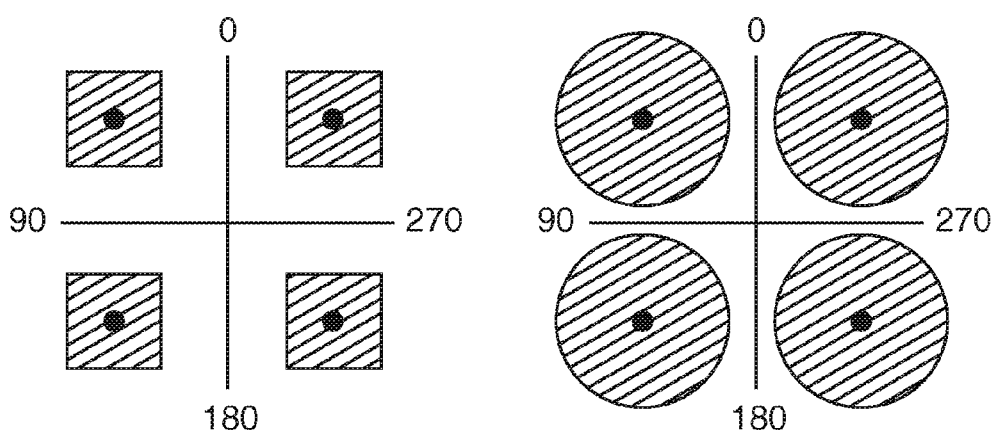
Fig. 30B  Fig. 30C

OPTICAL FILM HAVING MICROREPLICATED STRUCTURES AND METHODS

This application is a continuation of U.S. patent application Ser. No. 10/877,341, filed Jun. 25, 2004, which is a continuation of U.S. patent application Ser. No. 10/205,160, filed Jul. 25, 2002, now abandoned, which is a continuation-in part of U.S. application Ser. No. 09/922,438 filed Aug. 3, 2001, now abandoned.

The present invention is directed to optical films and the methods of manufacturing. In particular, the present invention is directed to optical films including a layer having microreplicated structures.

BACKGROUND OF THE INVENTION

Reflective imaging devices, also known as special light modulators, produce a viewable image by locally altering the reflection of light. One useful device of this type is the liquid crystal display, or LCD, in which light entering the display is either transmitted, reflected or blocked, in an imagewise manner, by electronically addressed pixels of liquid crystalline material sandwiched between polarizers, thereby forming a visible image on the display.

LCDs are often illuminated by light which enters one major surface, called the back side, of the LCD, and leaves the other, or front side, where the viewer resides. It is also possible, by means of suitable reflectors, to illuminate LCDs from the front, or viewing, side, and produce an illuminated image by means of ambient light reflected by the reflector, which is commonly called a back reflector. LCDs illuminated in this way are commonly called reflective LCDs, or RLCDs.

Both specular and diffuse back reflectors have been used, and each suffers certain disadvantages. Specular back reflectors may produce a metallic image appearance, may reflect images of objects located behind or above the viewer, and may provide unacceptably limited viewing angles, which may vary with specific ambient lighting conditions. Moreover, specular reflectors reflect incident light in such a way that the viewer's head may block incident illumination needed for best viewing. Diffuse reflectors, on the other hand, have the disadvantage of inefficient light utilization, in that they may diffuse light into locations in which viewers are unlikely to reside, thereby depriving more desirable viewing positions of illumination. These disadvantages are reduced in U.S. Pat. No. 4,298,249, which provides a back reflector having tilted reflecting surface strips, along with diffusing surface structures, so as to reflect incident light at angles which enable the display to be viewed from a more suitable position. Similarly, U.S. Pat. No. 6,204,903 discloses reflective and partially reflective surfaces having various structural shapes that direct reflected light in particular directions. In order to accommodate a variety of lighting conditions, U.S. Pat. No. 5,128,787 discloses a reflector having structures of various angles, so as to reflect light from a variety of sources into the desired viewing positions. The disclosed structures also have the advantage of reducing the effects of glare, since they enable the image to be viewed from positions outside of the areas receiving unwanted specularly reflected light from the various surfaces and interfaces of the display.

SUMMARY OF THE INVENTION

The present invention provides microstructured reflective surfaces which reflect incident light at predetermined angles, and which produce particular directional distributions of reflected light. The microstructured surfaces have a general overall shape with small tilted reflective microstructures built into the surface. The tilted microstructures have a longitudinal variation in height or elevation which is defined by a predefined periodic height or elevation. The height may vary according to a fixed period, a variable but deterministic period, a random period, or combinations thereof.

A suitable tool for producing microstructured surfaces according to the present invention can be made by diamond turning the desired pattern in a cylindrical blank made of a suitable metal such as hard copper, and using this cylinder as a casting tool to coat and form a microstructured layer of curable liquid composition onto a film backing. The depth function can be applied to the diamond turning process by means of a piezoelectric device incorporated into the diamond tool holder. Tool holders of this type are commonly referred to as fast tool servos, or FTSs; they may also be commonly referred to as fast servo tools. The signal used to drive the FTS may include single frequency or multiple frequency waves, signals from noise generators, and any other signals found to be useful. Signals may be filtered, so as to, for example, limit the frequency range or spectral profile of the varying height. Generally, the signals which can be used to generate the depth function are limited only by the suitability of a particular signal in producing a useful microstructure. Because of the relative simplicity of generating signals for use in the invention, it is also possible to take a very empirical approach to finding suitable signals for the generation of varying heights which produce the desired optical effects.

As used herein, the term reflective optical surfaces includes both highly reflective surfaces, such as mirrors, and optical surfaces which only partially reflect and which transmit significant amounts of light. Partial reflectors of this type are commonly referred to as transflective optical surfaces. The reflective surfaces of the present invention can be made reflective by, for example, metallizing with a suitable metal such as silver. Protective and other surface modifying coatings may also be incorporated.

Optical films having the reflective surfaces of the present invention are useful as back reflectors for LCDs, since they can be designed to reflect light in a useful range of directions, and can produce closely controlled distributions of light which more efficiently utilize available light and avoid glare effects.

In addition to the microstructures defined by the tilt angles and the depth function, additional surface treatments, such as chemical etching of the tool, may also be used to provide diffusion or other directional components to the reflected light distribution. Plating of the tool may be useful in improving durability of the tool and surface quality of the microstructured product.

In particular, in one aspect the present invention is directed to a light directing film having an x-axis, a y-axis, and a z-axis, the film having a first structured surface and an opposing surface. The structured surface has a plurality of elongate prismatic structures thereon, the elongate prismatic structures extending generally along the x-axis and having a spacing along the y-axis between adjacent prismatic structures. The structures also have a height along the z-axis, the height of the prismatic structure varying along the x-axis in a repeating period.

In another aspect, the present invention is to an optical device comprising a microreplicated light reflecting film, the film comprising a plurality of prismatic structures having a length, each of the plurality of prismatic structures having a height varying along the length in a repeating period. A metal film layer can be present on the film.

Also, the invention is directed to an article made using a programmably controlled cutting tool, the article having an x-axis, a y-axis, and a z-axis, the article comprising a plurality of structures extending generally along the x-axis, the plurality of structures having a spacing along the y-axis between adjacent prismatic structures, and the structures having a height along the z-axis, the height of the structure varying along the x-axis in a repeating pattern.

Methods for making a reflective structured film, according to the present invention, comprise machining a master tool from a blank with a cutting tool, the cutting tool being movable in an x-direction, a y-direction, and a z-direction. The machining comprises contacting the blank with the cutting tool; moving at least one of the blank and the cutting tool in relation to one another in the x-direction to cut the blank; moving at least one of the blank and the cutting tool in relation to one another in the y-direction to cut the blank; and moving at least one of the blank and the cutting tool in relation to one another in the z-direction to cut the blank. On this machined master tool, forming a structured film; and then applying a reflective coating to the structured film.

The methods of the present invention provide structured films that are more precise, more accurate, and more exact than film made by methods such as chemical etching, bead blasting, or other stochasitic surface modification techniques. Methods such as chemical etching, bead blasting, and other stochasitic surface modification techniques are not capable of reproducing exactly, for example to 0.001 micrometer, and even less to 0.0001 micrometer, the exact form from one prismatic structure to the next.

BRIEF DESCRIPTION OF THE DRAWINGS

The invention may be more completely understood by considering the detailed description of various embodiments of the invention, which follows in connection with the accompanying drawings.

FIG. 1A is a schematic cross-sectional view of a display apparatus incorporating a light directing construction.

FIG. 10A is a schematic perspective view of a fourth embodiment of a light directing film according to the present invention.

FIG. 15 is a graphical representation of the reflected light intensity of the light directing film of Example 8 as measured on an ELDIM EZ Contrast model 160R used in the reflective mode with 34 degree incident collimated light.

FIG. 30A is a schematic perspective view of an eighteenth embodiment of a light directing film according to the present invention.

FIG. 30B is a schematic, graphical representation of the reflected light intensity of the light directing film of Example 25 when illuminated with normally incident collimated light.

FIG. 30C is a schematic, graphical representation of the reflected light intensity of the light directing film of Example 26 when illuminated with normally incident collimated light.

DETAILED DESCRIPTION

Figure 1B:
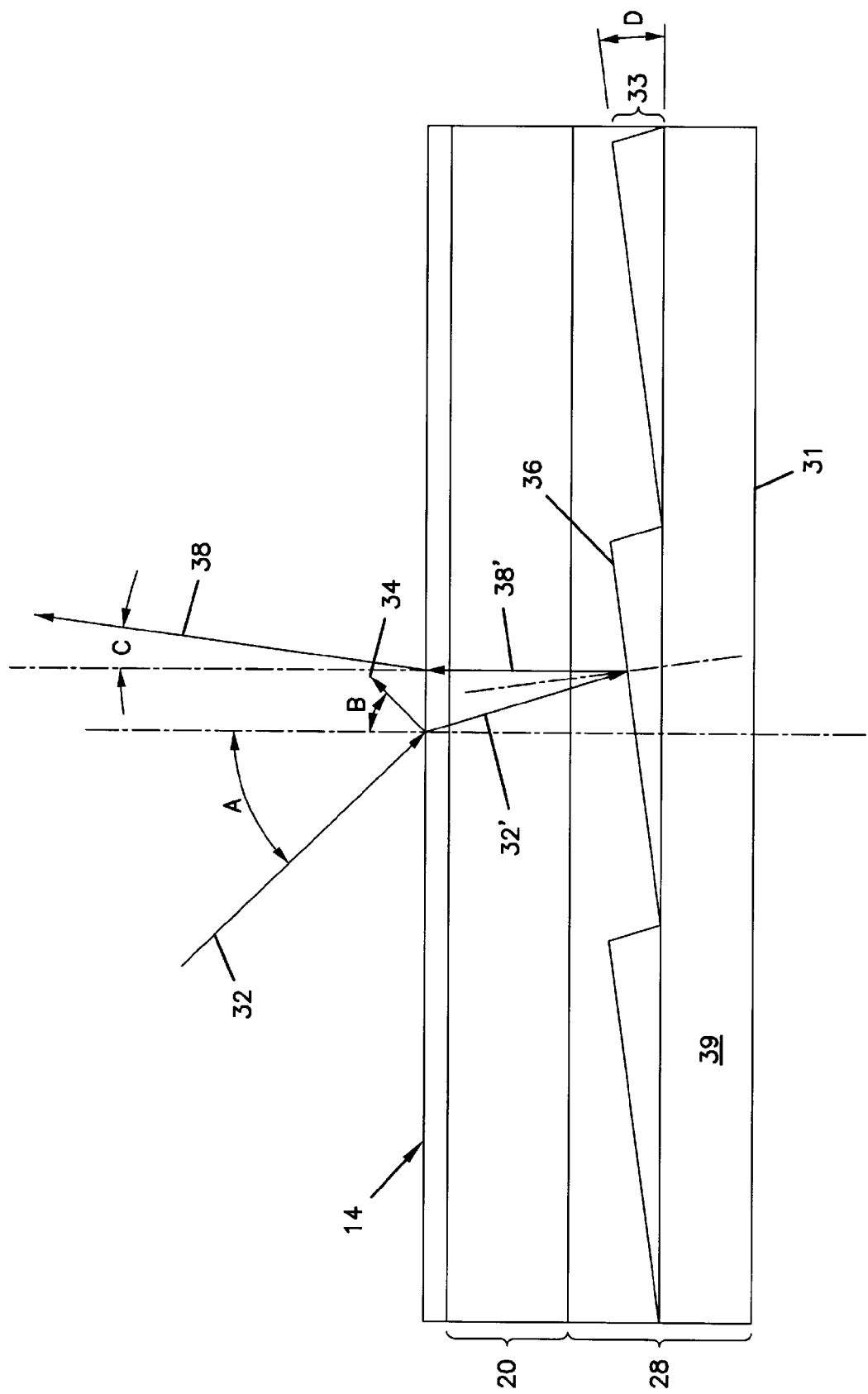
FIG. 1B is an enlarged schematic cross-sectional view of a portion of the light direction construction of the display apparatus of FIG. 1A.

The present invention is directed to an optical film that improves the utilization of light in a reflective liquid crystal display (RLCD) by precisely shaping the pattern of light diffusely reflected by the RLCD. Specifically, the distribution of reflected light is shaped as desired for greater uniformity and brightness by designing the surface features of the back reflector of the RLCD to reflect in particular directions.

As used herein, an optical film is a film having a structured or prismatic surface that includes structures that reflect the light at desired angles in respect to the RLDC.

A reflective display apparatus 10, such as an RLCD, is shown in FIG. 1A. Display apparatus 10 uses ambient light to illuminate displayed information viewable through an additional optional component 14, which may be a lens, touch screen, or other like element of display apparatus 10. Component 14 may contribute specific optical qualities to the display, and may receive input from the user of the display. Display apparatus 10 further includes a light modulating layer 20, containing a top polarizer 22, a liquid crystal layer 24, and a bottom polarizer 26. Further, a light directing construction 28, which includes the light directing film, is located adjacent to bottom polarizer 26. It has been found useful and convenient in some embodiments for light directing construction 28 to be attached to bottom polarizer 26. The light directing film of the present invention may also be incorporated into a display device that includes only one polarizer or no polarizers (for example, a guest-host LCD), although it will more commonly be used in a device having two polarizers that sandwich the liquid crystal layer.

A typical display apparatus 10, with the various layers, has been described herein. It is understood that generally any of the layers may be altered or eliminated and still have a usable display 10; additional layers can also be added. A compensation layer or film is a non-isotropic optically refractive film that can be included in the display apparatus. The various layers may be rearranged or reorganized to provide a different structure that functions as a usable display. In some embodiments, a single layer may function as two layers described above. Still further, any multiple layers may be adhered or laminated together to provide fewer discrete layers. For example, the light directing film could be laminated to the polarizer or to a compensation film. All permutations of display apparatus 10, which incorporate a light directing film as taught by the present invention, are disclosed herein.

Referring again to FIG. 1A, an ambient light source 30 produces incoming ambient light rays 32. In these illustrations, light ray 32 from source 30 is incident on the display apparatus at angle a from the normal. The normal is the direction perpendicular to the display surface. A portion of the incoming light will be reflected as glare, illustrated by glare ray 34 in FIG. 1A, by the top surface of display apparatus 10 and internal interfaces. The glare ray 34 has a glare angle, b, from the normal. If the interfaces encountered by ray 32 are specularly reflecting surfaces, glare angle b will be equal to angle of incidence a. Since angle a can include a range of values, representing light from various sources which are likely to be present, glare will be visible over a range of viewing angles, but will typically have one or more brightness peaks, at, for example, glare angle b.

A significant portion of the incoming light will pass through light modulating layer 20 and be reflected by light directing construction 28, thereby illuminating the display information or image, e, and emerging as image ray 38. The light directing construction 28 is designed to direct the image ray 38 so that it will emerge from the display 10 at an angle from the normal that is substantially different than the glare angle b. This is generally referred to as "beam-steering". Quantitatively, the specific angle of image ray 38 is usually governed by Snell's Law of Refraction and the specific properties of light directing construction 28.

Referring to FIG. 1B, which is an enlarged view compared to FIG. 1A, light directing construction 28, shown as a structured layer, is provided to steer the image produced by light modulating layer 20 toward a desired viewing angle, which is substantially different than a glare angle of display 10. Light directing construction 28 may also be referred to as a beam steering film or tilted mirror film.

In FIG. 1B, incoming light ray 32 is incident on the display apparatus at angle a from normal, represented by line 33. The normal is the direction perpendicular to the display surface. Incoming light ray 32 is refracted by the various components of display 10, creating a bend in light ray 32, thereby forming light ray 32'. That portion of the incoming light not reflected as glare will pass through light modulating layer 20 and be reflected by light directing construction 28, thereby illuminating light modulating layer 20 and producing image ray 38. The specific angle of reflectance from light directing construction 28 is dependent on the angle of facet 36, designated by angle d. It will be appreciated that while FIG. 1B portrays facet 36 as a flat surface having a single angle d, other, nonflat, facets may be used, and in some cases may be preferred, depending upon specific lighting conditions and viewing angles desired. Note again that as image ray 38 passes through display 10, the ray is refracted, creating a bend in image ray 38, so that it emerges at angle c from normal.

The range of viewing angles over which the image can be viewed, and the range of viewing angles at which peak brightness occurs, can be controlled by the specific design of light directing construction 28.

In FIG. 1A, the peak image angle or optimal viewing angle is nearly normal to the display, as represented by image ray 38. As a result, a viewer of the display apparatus 10 at position 44 can view the display image clearly without interference from the glare image which is at angle b from image ray 38. More generally, in FIG. 1B, the peak image angle or optimal viewing angle is at angle c to the display normal, as represented by image ray 38. As a result, a viewer of the display apparatus 10 can view the display image clearly without interference from the glare image, which is at a different angle, b to the display.

Light directing construction 28, as seen in FIG. 1B, is a structured, prismatic, light directing film that has a smooth surface 31 and structured surface 33, as will be described in detail below in reference to the Figures. Smooth surface 31 lies away from the back of display 10 and the structured surface lies toward light modulating layer 20, facing light source 30. In some embodiments, the structured surface could lie facing away from display 10. Although surface 31 is described here as smooth, it is understood that the surface could be rough, wavy, textured, or could have prismatic structures thereon. Variations on light directing construction 28 and its operation in the invention will be described in greater detail below.

Figure 2A:
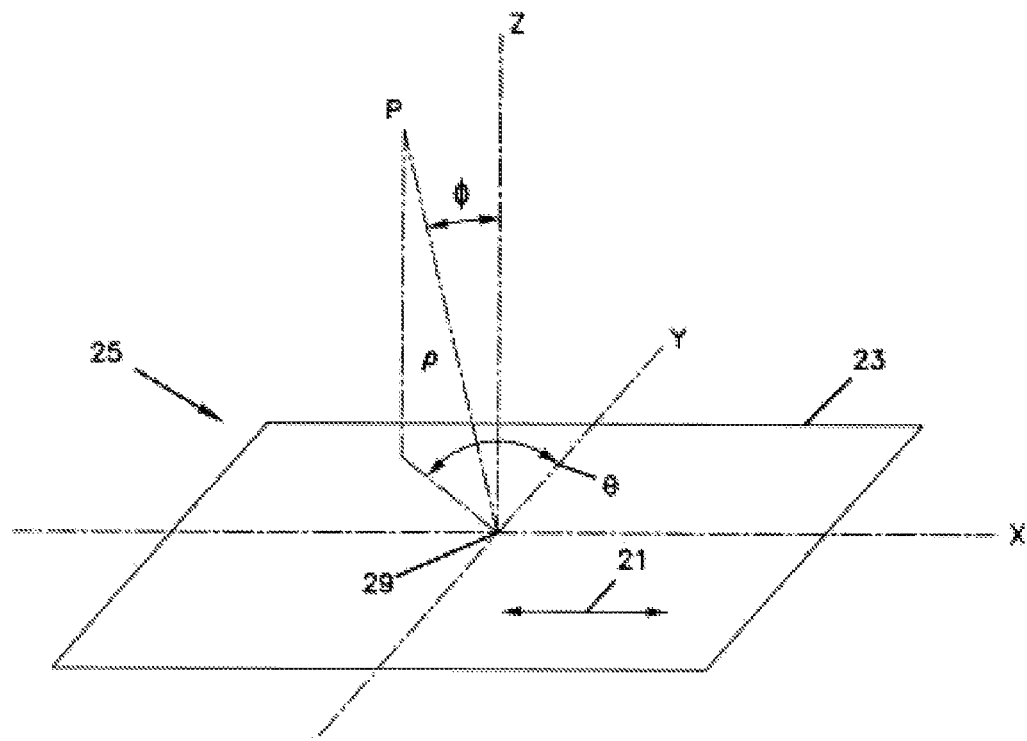
FIG. 2A is a schematic depiction of the coordinate system used to quantitatively describe the light distribution seen by a viewer of a display apparatus.

The present invention is directed to designing a light directing construction to provide a desired image beam intensity distribution over a desired range of angles. The direction and angular extent of the reflected beam can be varied by the specific construction of the prismatic light directing film. The coordinate system used to quantitatively describe the light distribution seen by a viewer of an RLCD is shown in FIG. 2A. In FIG. 2A, point "P" may be the viewer, a photometer for measuring luminance, a light source, or other item of interest. Point "P" has spherical coordinates $\theta$ (theta), called the azimuthal angle, or simply azimuth; $\phi$ (phi), called the polar angle; and $\rho$ (rho), called the radial coordinate. In FIG. 2A, point 29 is a point on display 25, and edge 23 is the top of the display, as seen by a viewer. Tests of distribution of reflected light are typically done using collimated light incident at a polar angle $\phi$ of 34° and an azimuth of 0°.

The particular effects of the beam-steering can be seen when the physical examples are characterized with an ELDIM EZ Contrast model 160R photometer, a conoscopic photometer, used in the reflective mode with 34 degree incident collimated light. The ELDIM instrument measures the reflected luminance as a function of $\theta$ and $\phi$, and plots the data over the polar angle range from 0 degrees (film normal) to 80 degrees (10 degrees out of the film plane) and over the full 360 degree azimuthal angle range. The optical gain is obtained by normalizing the sample luminance with respect to the luminance of a white lambertian standard measured under the same conditions. Plots using this coordinate system can be seen in FIGS. 4, 7, 8, 11, 12, 13, 15 and 16, where $\theta$ is represented as degrees around the circular plot, starting at the top of the plot and rotating counterclockwise, while $\phi$ is represented by radial distances from the center of the plot.

Figure 2B:
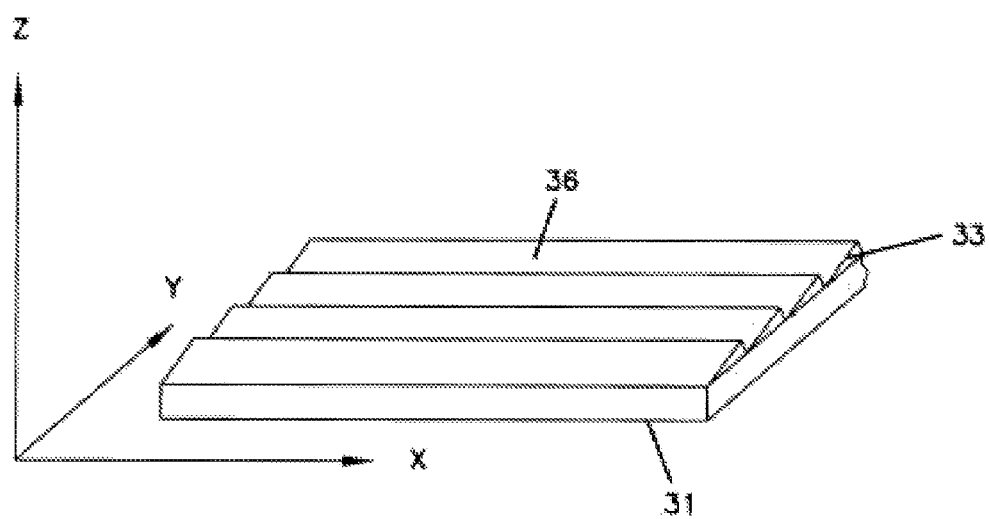
FIG. 2B is a schematic perspective view of a light directing film, indicating the relative axis for the construction.

FIG. 2B is a perspective view of a general light directing construction showing a prismatic structure. The following examples will be described using the axes shown in FIG. 2B. The "x-axis" or "x-direction", also referred to as the longitudinal direction of the structure, is in the direction of the ridges, or microstructures. The "y-axis" or "y-direction" is orthogonal to the x-axis, and transverses the face of the structures, so that the x and y axes define reference plane 29, which defines the overall shape of light directing element 28, and the "z-axis" or "z-direction" is perpendicular to the plane formed by the x and y-axes, extending from the back to the front of light directing element 28.

Figure 2C:
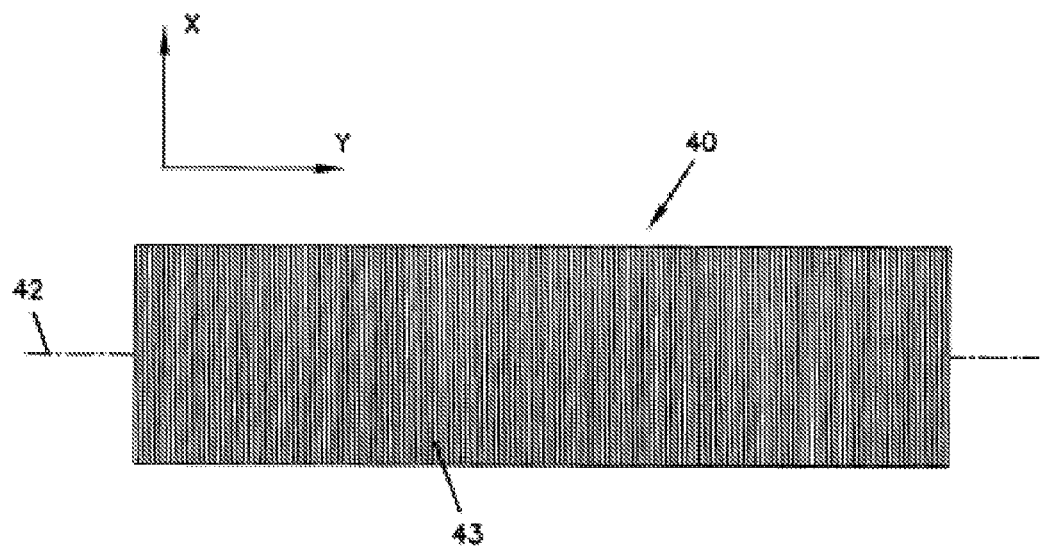
FIG. 2C is a schematic plan view of a cylindrical tool that can be used for manufacturing a light directing film.

Light directing constructions having structures 33 can be conveniently produced using a cylindrical casting tool of the type portrayed in FIG. 2C. In FIG. 2C, cylindrical tool 40, having center axis 42, is produced by cutting circumferential grooves 43 in a cylindrical blank. The grooves are of shapes suitable for producing structures 33 when a suitably formable material is placed between grooves 43 and a backing material such as a flexible polymeric film. When describing tools of this sort, the x and y directions relative to the tool, as shown in FIG. 2C, are consistent with the x and y directions on the light directing film shown in FIG. 2B.

The light directing film of the present invention may be of any formable material, and is typically transparent. UV polymerizable materials, including acrylics, and polycarbonates are preferred materials. Generally, the UV polymerizable composition for making the light directing film includes a vinyl monomer, for example, an alkyl styrene monomer such as methyl styrene, and various co-monomers and/or oligomers. In one example, the composition comprises each of bisphenol-A epoxy diacrylate, novolak epoxy acrylate, and a vinyl monomer, which includes alkyl styrenes (for example, methyl styrene); such a composition is considered an "epoxy acrylate". An initiator may be added to provide a free radical source to initiate polymerization of the composition to a polymerized structure.

One example of a preferred UV polymerizable epoxy acrylate composition for use in the light directing film includes the following components, which are listed with a range of percentage weight: bisphenol-A epoxy diacrylate (55-80%), acrylated epoxy (1-10%), methyl styrene (5-25%), a photoinitiator (0.25-5%) (such as "Lucirin TPO"), and a fluorosurfactant (0.1-0.3%). Further, the composition can include a second photoinitiator, such as "Irgacure 184", at a percentage weight up to about 5%. Additional details regarding these preferred UV-curable compositions are found in U.S. patent application Ser. No. 09/425,270 (Fong), filed Oct. 22, 1999, and incorporated herein by reference.

A reflective coating can be provided on the structured film. This reflective coating can be opaque, or can be a metal such as silver, chromium, nickel, aluminum, titanium, aluminum-titanium alloy, gold, zirconium, platinum, palladium, aluminum-chromium alloy, rhodium, or combinations. A preferred reflective metal coating is silver. The reflective coating may be continuous or discontinuous; discontinuous coatings can be achieved by applying a discontinuous coating or by removing portions of a continuous coating.

Additional layers, such as adhesion promoting layers, diffusion barrier layers, and anticorrosion layers may also be used to improve the performance and durability of the reflective metal coating. One example of a preferred corrosion resistant layer is taught in PCT published application WO 01/31393 (Gardner et al.), incorporated herein by reference.

A diffuser layer is preferably coated over the structured film to hide film defects and eliminate moiré effects. The light directing films of the present invention provide sufficient light diffusion because of the prismatic structure, so that the diffuser layer is not needed to provide diffusion of the reflected light. One example of a diffuser layer is a polymethyl-methacrylate polymer loaded with polymeric or glass beads.

The polymer host or carrier generally has a refractive index of 1.4 to 1.5, although it could be greater or less. The beads, either polymeric or glass, generally have a refractive index of 1.35 to 1.7. The difference in refractive index between the beads and the host or carrier polymer is the determinate property when selecting beads and polymer. Preferably the difference in refractive indexes, in most applications, is 0.01 to 0.2, preferably 0.02 to 0.1.

The average diameter of the beads is generally 0.5 to 20 micrometers, with 2 to 5 micrometers being the preferred bead diameter when used for handheld display devices. The amount of beads loaded into the polymer depends on the average diameter of the beads. Small diameter beads lead to less bead volume loading and larger diameter beads lead to higher volume loading. As an example, for refractive index differences about 0.05 and bead diameters about 5 micrometers, useful loading levels are 1% to 10%.

A diffuser layer, when loaded fairly densely with beads, disperses light from distant sources to provide a uniformly luminous back reflection with no discernable image of the source and hides defects and artifacts. PCT published application WO 97/01610 (Goetz et al.), incorporated herein by reference, teaches a light diffusing adhesive that can be used with the films of the present invention to mask defects and other artifacts.

Another technique for creating random scattering includes providing a matte finish on the tool, which can be obtained by acid etching, ionic plating, or bead blasting the structured copper tool after machining the grooves.

Absorbing dyes or pigments can be added to the composition, or to other layers within the light directing construction, to alter the color of the display. For example, a silver metal film, when viewed in ambient light, often has a slightly yellow appearance. An absorbing dye can be added to the construction to compensate for the yellow appearance and provide a color-neutral reflector.

The light directing film can be made by many different methods known in the art, such as by applying the polymerizable composition between a substrate and a tool or mold having a plurality of cavities having the inverse shape of the prism and polymerizing the composition under UV radiation, and then separating the sheet from the tool. Other methods for forming prismatic structures are also known and may be utilized in the present invention. Because of the small size of the prisms, the process of producing the three-dimensional structure is often referred to as "microreplication". For additional information regarding microreplication of three-dimensional structures, see for example, U.S. Pat. No. 5,183,597 (Lu), which is incorporated herein by reference.

The tool, by which the prisms are formed, may be made by known diamond turning techniques, as disclosed, for example, in commonly assigned laid-open PCT Application WO 00/48037, incorporated herein by reference. Typically the master tool is made by diamond turning on a cylindrical blank known as a roll. The surface of the roll is typically of hard copper, although other materials may be used. The prism structures are formed in continuous patterns around the circumference of the roll. In a preferred embodiment the grooves are produced by a technique known as thread cutting. In thread cutting, a single, continuous groove is cut on the roll (in the x-direction) while the diamond bit is moved in a direction transverse (the y-direction) to the turning roll. The distance between adjacent cuts is referred to as the "pitch". To provide structures with a constant pitch, the diamond bit is moved at a constant velocity.

Figure 9:
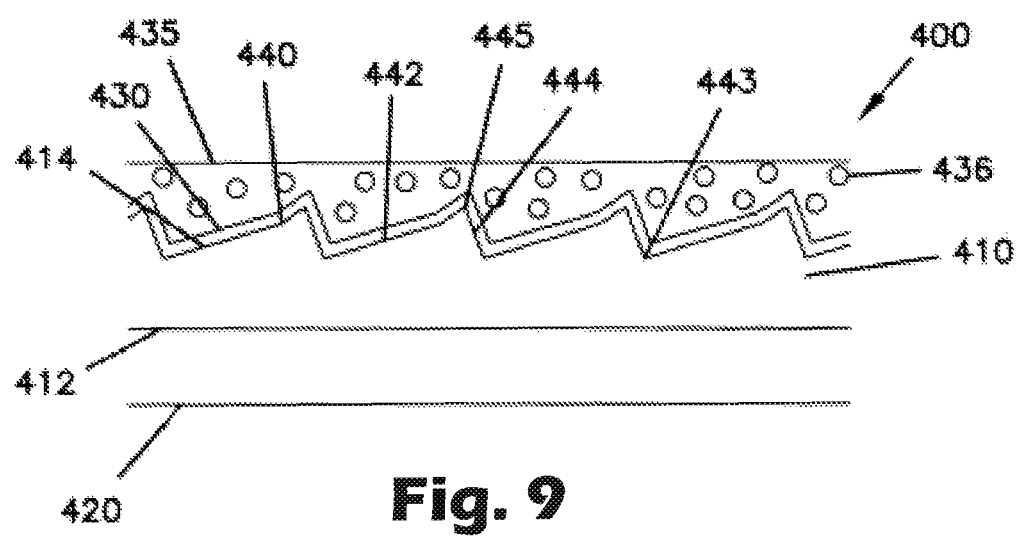
FIG. 9 is a schematic cross-sectional view of a third embodiment of a light directing construction according to the present invention.
Figure 7:
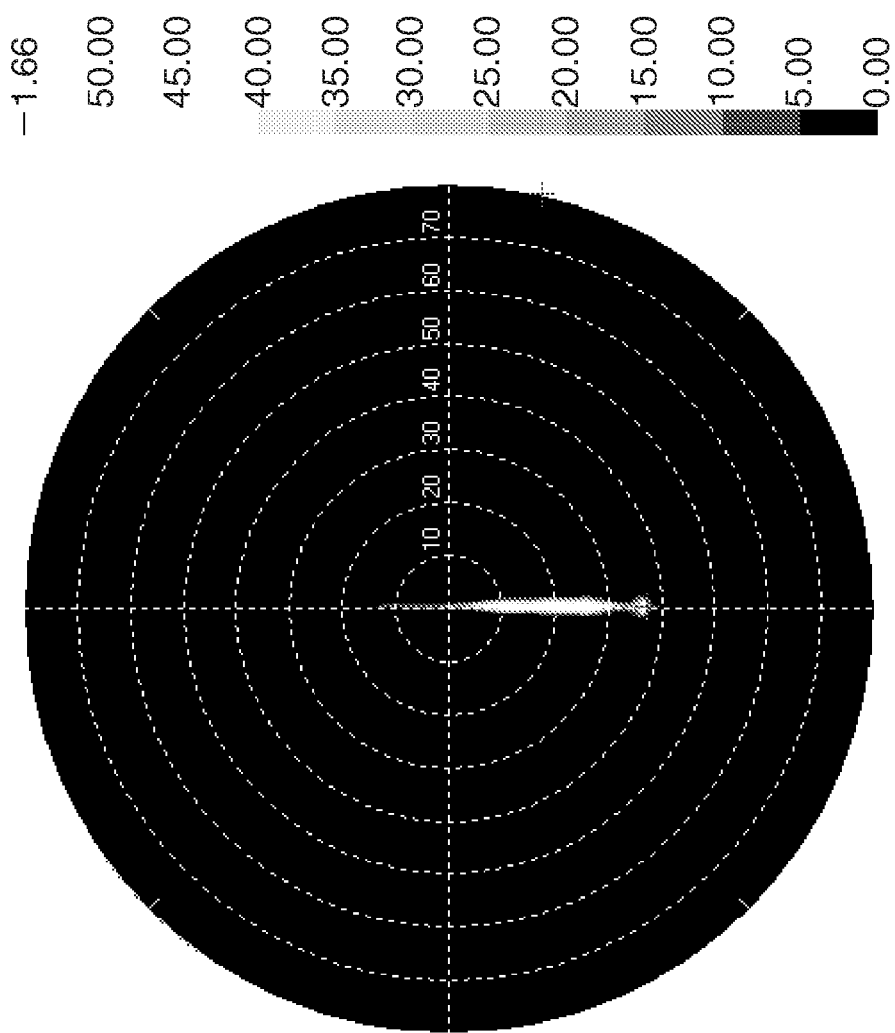
FIG. 7 is a graphical representation of the reflected light intensity of the light directing film of Example 3A, generally shown in FIG. 6, as measured on an ELDIM EZ Contrast model 160R used in the reflective mode with 34 degree incident collimated light.

General diamond turning techniques are generally known in the art; see for example, PCT Published application WO 00/48037, specifically FIGS. 7 and 9 and the descriptions thereof. This published application describes various apparatus and methods that can be used to manufacture the master tool from a roll or drum; this entire disclosure being incorporated herein by reference.

The apparatus used in methods and for making the light directing films of the present invention includes a fast servo tool. As disclosed in WO 00/48037, a fast tool servo (FTS) is a solid state piezoelectric device which rapidly adjusts the position of the cutting tool. One type of FTS is known as a PZT. The FTS allows for major axis of movement of the cutting tool in the y-direction and the z-direction, and also provides oscillation or other minute modulation in the y-direction and the z-direction. The movement in the x-direction is provided for by the rotation of the workpiece, in this case the cylinder being cut. Oscillation, if present, is generally superimposed over the major cutting tool movement. Additionally or alternatively, the cutting tool can be rocked or rotated about the x-axis during the machining to provide yet another feature.

In an alternative embodiment, the z direction movement of the diamond cutting tool can be used to form the ridges, by, for example, driving the FTS with a signal produced by a periodic ramp function, to form a series of facets. The transition between the top of one ridge and bottom of the next ridge may be somewhat rounded, due to limitations on the frequency response of the FTS. Ramp functions of this sort would produce ridge-like structures which provide net changes in direction of reflected light in accordance with the present invention. When the cutting is made in this manner, the longitudinal direction of the prism structures will be parallel to the axis of rotation of the tool being cut, rather than perpendicular to it. Moreover, since the ramp functions are not necessarily synchronized from one rotation of the cylinder to the next, the ridges may not be continuous, or synchronized, over the entire tool; rather, the ridges may be asynchronous. As a result, the appearance of the illumination of the display, as seen by the viewer, may be improved. The rounded transition regions of the casting tool may also serve to improve the appearance of the RLCD. In order to provide additional light directing features, the diamond cutting tool may be provided with a curved or other suitable cutting profile in order to further modify reflected light distributions.

The prismatic structures can be made by methods other than described above. For example, the structure of the master tool can be transferred on other media, such as to a belt or web of polymeric material, by a cast and cure process from the master tool to form a production tool; this production tool is then used to make the prismatic structure. Other methods such as electroforming can be used to copy the master tool. Another alternate method to make the light directing film is to directly cut or machine a transparent material to form the prismatic structures.

The prismatic structures and methods of the present invention are limited only by the signals that can be generated, and frequency response of the electronics, the FTS actuator and mechanical properties of the tool surface.

Chemical etching, bead blasting, or other stochasitic surface modification techniques are typically not capable of forming the sharp, precise prismatic structures, and the breadth of features, desired to obtain the light diffusion characteristic achieved with a cutting tool using the methods of the present invention. These unacceptable methods are not capable of producing highly accurate, repeating structures as in accordance with the present invention, because the inherent impreciseness and unrepeatability associated with chemical etching, bead blasting, and other stochasitic surface modification techniques.

The invention will be further described and illustrated in the examples that follow. The examples are illustrative of the invention and should not be construed as limiting the scope to their details. It is to be understood that throughout the Examples and the rest of this application, the terms "micrometers", "microns" and "µm" are used interchangeably.

EXAMPLES

The Example light directing films were produced by microreplicating a UV sensitized epoxy acrylate resin in a tool that had been cut with a diamond cutter or bit to produce a facet profile. While the epoxy acrylate resin was on the tool, 5 mil (127 micrometer) PET substrate was adhered to the exposed surface of the resin. After the epoxy acrylate resin was polymerized via UV radiation, the resulting light directing film was removed from the tool.

The master tool for each of the Examples was produced by machining a copper sheet or blank, that was formed to a cylinder, with a diamond tip cutting tool. To begin the machining process, the cutting tool was lowered into the copper blank in the z-direction. The cylinder rotated around its central axis, thus moving the cutting tool in the x-direction. The cutting tool was constantly moved along the surface of the cylinder in the y-direction, thus producing a spiral groove on the cylinder surface. For some Examples, the diamond cutting tool was moved in the z-direction by a FTS ("fast tool servo" or "fast servo tool"). The machined copper sheet was removed from the cylinder and used to make the light directing film.

Example 1

Comparative Example

Figure 3:
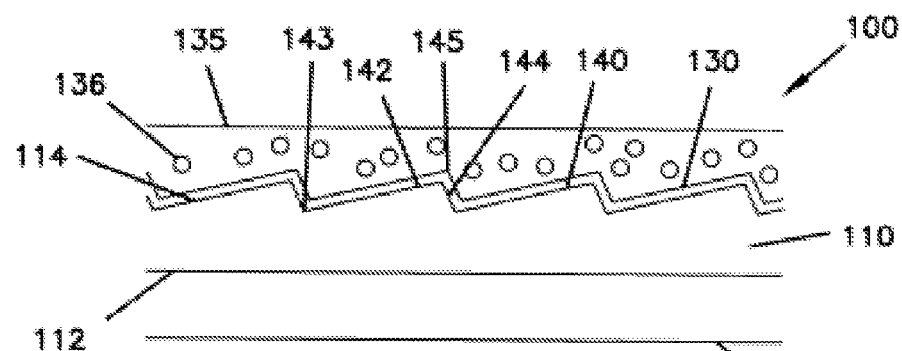
FIG. 3 is a schematic cross-sectional view of a conventional light directing construction having a conventional structure layer.

FIG. 3 is an enlarged cross-sectional view of a first example of a light directing construction 100, which includes a conventional light directing film 110. An example of such a film is available from Minnesota Mining and Manufacturing Company (3M) under the designation "Tilted Mirror Film 6.3". This view of light directing film 110 is similar to the orientation shown in FIG. 1B, with the y-axis extending across the structure from left to right in the figure, and the z-axis extending top to bottom of the figure. The x-axis extends into the page.

Light directing film 110 has a smooth surface 112 and a structured surface 114. Structured surface 114 includes a plurality of triangular prisms 140, each having a first prism face 142 and a second prism face 144, alternating with valleys 143 and peaks 145. First prism face 142 and second prism face 144 together define the pitch or period of the light directing film 110.

In this embodiment, light directing film 110 is defined by a repeating array of angular prisms 140. The pitch of the repeating prisms 140, measured from either valley 143 to valley 143, or peak 145 to peak 145, is generally between 10 µm and 100 µm and more preferably between about 30 µm and 80 µm. In this example, light directing film 110 has a 50 micrometer pitch. That is, the length in the y-direction between repeating peaks 145 is 50 micrometers.

First prism face 142 is generally referred to as a "facet" or "reflective facet", because the majority of light reflected by light directing construction 100 is reflected by first prism face 142. In this example, first prism face 142 has a 6 degree elevation from the y-direction, which is also referred to as mirror angle. It is understood that angles other than 6 degrees can be used. Generally, angles of 0 to 30 degrees, preferably 5 to 9 degrees, are used.

Each prism 140 has a peak angle or included angle, defined by first prism face 142 and second prism face 144. Each peak 45 has the same peak angle, about 86 degrees.

Light directing film 110, made by the techniques described above, is positioned on substrate 120; specifically, smooth surface 112 of light directing film 110 is positioned against substrate 120. An adhesive can be used to secure light directing film 110 onto substrate 120, or light directing film 110 can be adhered onto substrate 120 by the same material that forms prisms 140. In some embodiments, substrate 120 is the substrate used during the microreplication process.

Overlying prisms 140 is a reflective metal coating 130, which is positioned over structured surface 114 of light directing film 110. Reflective metal coating can be silver or any other useful coating.

Overlying metal coating layer 130 is a diffuser layer 135, such as a polymethyl-methacrylate polymer loaded with polymeric or glass beads. The diffusion caused by diffuser layer 135 is rotationally symmetrical around the peak of light reflected by light directing film 110, thus the diffusion width in the YZ plane is the same as the width in the XZ plane.

Figure 4:
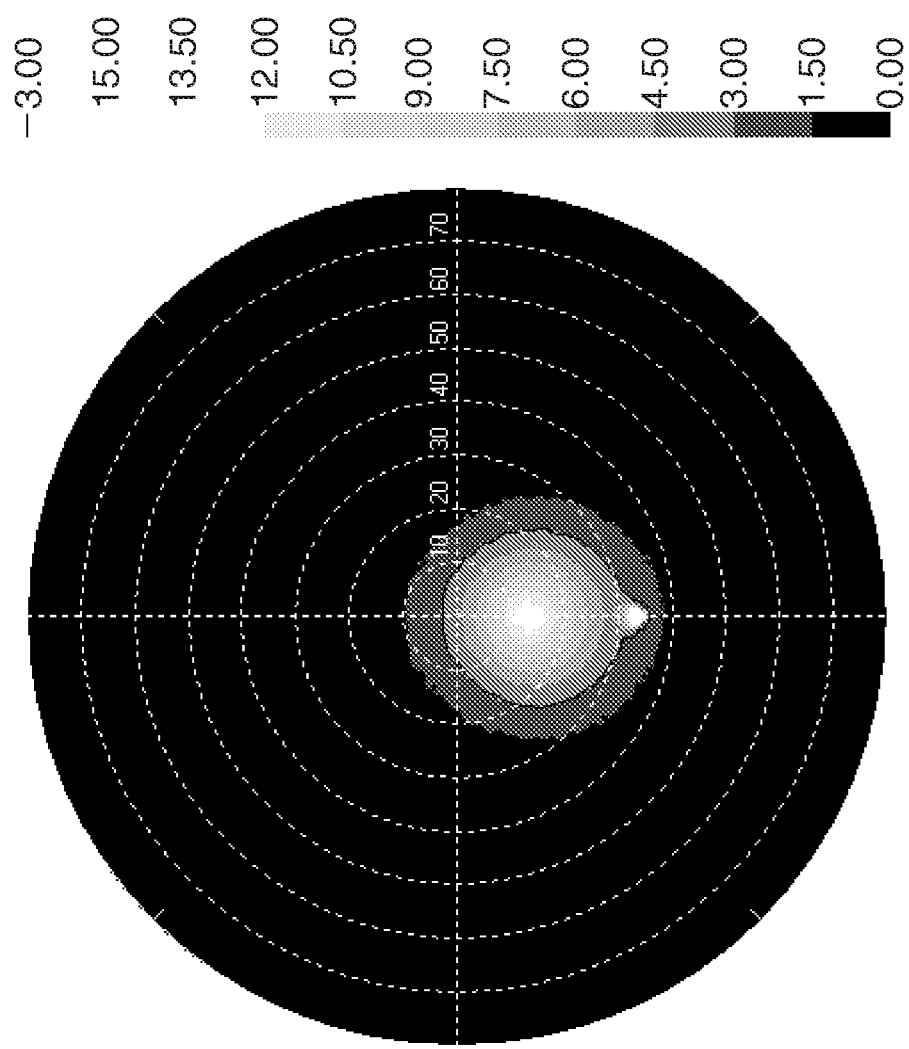
FIG. 4 is a graphical representation of the reflected light intensity of the light directing film of Comparative Example 1, shown in FIG. 3, as measured on an ELDIM EZ Contrast model 160R used in the reflective mode with 34 degree incident collimated light.

The specific prism and facet dimensions for Comparative Example 1 are provided in Tables 1 and 2 below; all measurements are provided in micrometers. The light reflectance of Comparative Example 1 was measured on an ELDIM EZ Contrast model 160R used in the reflective mode with 34 degree incident collimated light; FIG. 4 is the resulting plot. FIG. 4 shows the sharp glare peak at 34 degrees and the broader back reflected peak centered at 14 degrees. Overall, the reflected light is present as a steep peak, with a higher intensity in the center and gradually decreasing until no reflected light is measured.

The light directing constructions of the present invention, which include a light directing film, differ from the sample of Comparative Example 1 in that the reflection of the light is manipulated and steered by the prismatic structures to provide a desired light distribution. In most instances, a flat or top hat distribution of light intensity, rather than a peaked or bell shaped curve distribution, is desired; this is achieved when a collimated beam of light is scattered by the surface into a constant luminance within a specified angle of width, centered in a direction also determined by the prismatic features. The beam steering property may bias the reflectance angle away from the glare direction by any reasonable amount, such as from 0 to 45 degrees.

Diffusion in YZ Plane

Various techniques can be used to provide the desired prismatic structures. For example, the structures can be formed so that each structure does not have the same facet angle as the adjacent structures. By varying the facet angle either continuously or from row to row, the reflectance of light by the light directing film is altered, providing a diffused reflectance in the YZ plane over a wide range of angles.

Example 2

Variable Facet or Prism Angle

Figure 5:
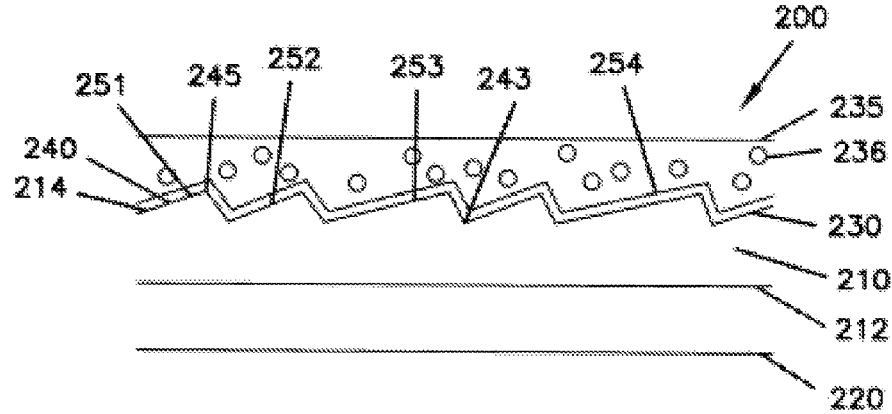
FIG. 5 is a schematic cross-sectional view of a first embodiment of a light directing construction according to a first aspect of the present invention.

FIG. 5 is a cross-sectional view of a light directing construction 200, which includes a light directing film 210, according to one aspect of the present invention. This view of light directing film 210 is similar to the orientation shown in FIG. 2, with the y-axis extending across the structure from left to right in the figure, and the z-axis extending top to bottom of the figure. The x-axis extends into the page.

Light directing film 210 has a smooth surface 212 and a structured surface 214, which create a plurality of prisms 240 having a first prism face 242 and a second prism face 244 that define valleys 243 and peaks 245. First prism face 242 and second prism face 244 form a pair of faces that define a composite. Generally, first prism face 242 is used for reflecting light; second prism face 244 does not participate in light reflectance or direction. Smooth surface 212 of film 210 is adjacent substrate 220. Overlying light direction film 210 is a metal coating 230 and a diffuser layer 235.

Unlike prisms 140 of light directing film 110 in FIG. 3, prisms 240 are not all the same; see prisms 251, 252, 253, 254. Prism 251 is different than prism 252, which is different than prism 253, and so on. It is understood that not every prism of light directing film 210 is different than every other prism of light directing film 210. Rather, it is desired that a prism is different than the adjacent prism or prisms. Referring to FIG. 5, prism 252 is different than adjacent prism 251 and is also different from adjacent prism 253. Preferably, there are at least two prisms between two similar prisms, more preferably, at least four prisms between two similar prisms. It may be beneficial to cluster a group of prisms in a specific pattern or order to optimize hiding of visible patterns.

The prisms differ, at least, in that the reflective facets, i.e., first prism face 242, have differing slopes, thereby increasing optical diffusion; the slope of first prism face 242 is generally measured from smooth surface 212. First prism face 242 of the various prisms will generally vary in length in relation to the slope of first prism face 242. In most instances, peaks 245 of the prisms will be equally distanced from smooth surface 212, however, in some instances, as is shown in FIG. 5, adjacent peaks 245 may have different heights.

Diffuser layer 235 is a low-density diffuser material, such as a polymethyl-methacrylate polymer loaded with polymeric or glass beads 236. Diffuser layer 235, having less beads than diffuser layer 135 of light directing construction 100, hides defects and artifacts, and integrates multiple reflection peaks generated by the varying prism angle.

The various angles in the YZ plane can be made by rocking the diamond cutting bit used to make the master tool with a high frequency periodic or random motion to produce a more optically diffuse surface. The variable prism angle provides diffusion in the YZ plane. That diffusion, superimposed on the diffusion from volume diffuser layer 235 provides an additional degree of freedom to differentiate the diffusion widths in the XZ and YZ planes.

In another embodiment, the master tool can be cut with a shaped diamond-cutting bit, resulting in the bit shape being non-planar or non-linear. Alternately or additionally, the tool can be cut by multiple passes with the cutting bit positioned at a different angle and in a different position than for a previous pass. The resulting non-planar facets provide a beam-steering effect and controlled light diffusion in the YZ plane, which adds to the random diffusion of diffuser layer. The curved or non-linear cutting edge of the diamond bit or cutter provides the variable slope desired to provide diffusion of the light. Further, the precise shape of the cutting edge determines the diffusion profile.

Examples 3A and 3B

Curved, Non-Linear Facets

Figure 6:
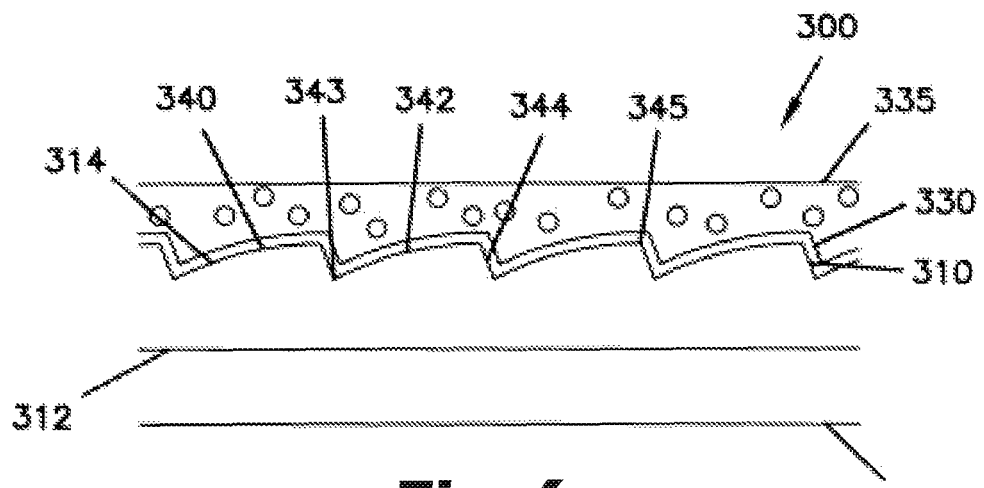
FIG. 6 is a schematic cross-sectional view of a second embodiment of a light directing construction according to the present invention.

FIG. 6 is a cross-sectional view of a light directing construction 300 according to another aspect of the present invention. This view of light directing construction 300, and light directing film 310, is similar to the orientation shown in FIG. 2, with the y-axis extending across the structure from left to right in the figure, and the z-axis extending top to bottom of the figure. The x-axis extends into the page.

Light directing construction 300 includes a light directing film 310 having a smooth surface 312 and a structured surface 314, which includes a plurality of prisms 340 having a first prism face 342 and a second prism face 344 that define valleys 343 and peaks 345. Smooth surface 312 is adjacent substrate 320. Overlying light direction film 310 is a metal coating 330 and a diffuser layer 335 having a low concentration of glass or polymeric beads 336 to mask artifacts and defects.

First prism face 342, rather than being a linear face such as face 142 of FIG. 3 and face 242 of FIG. 5, has a curvature associated with it. The curved surface spans surface angles from a few degrees to several degrees around the average surface angle. That is, a line drawn tangential to first prism face 342 would have be at an angle of 0 to 30 degrees to smooth surface 312, typically 4 to 8 degrees. The curved first prism face 342 forms a reflective facet that can be used to weight the reflected light into a shaped lobe. Alternately, the curved first prism face 342 can be structured to provide a square reflectance profile.

Example 3A was the light directing film 310 alone, and Example 3B had coated onto light directing film 310 a diffuser layer 335 having a 6% volume concentration of polymeric beads. The specific prism and facet dimensions for Examples 3A and 3B are provided in Tables 1 and 2 below.

Figure 8:
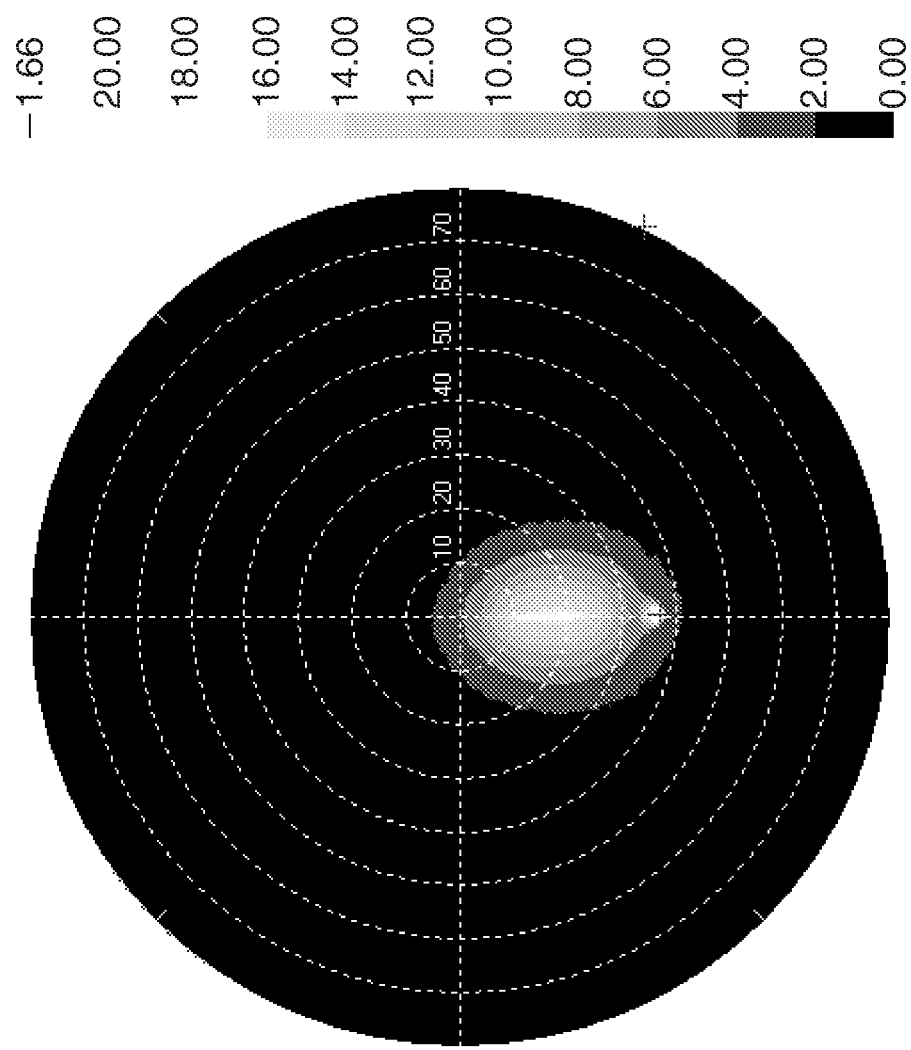
FIG. 8 is a graphical representation of the reflected light intensity of the light directing film of Example 3B, generally shown in FIG. 6, as measured on an ELDIM EZ Contrast model 160R used in the reflective mode with 34 degree incident collimated light.

Examples 3A and 3B were characterized with an ELDIM EZ Contrast model 160R used in the reflective mode with a 34 degree incident collimated light source and the resulting plots are shown in FIGS. 7 and 8, respectively.

For Example 3A, similar to Example 2 above, the non-linear facets provides diffusion in the YZ plane, as seen in FIG. 7. As seen in FIG. 8, that diffusion, superimposed on the diffusion from volume diffuser layer 335 provides an additional degree of freedom to differentiate the diffusion widths in the XZ and YZ planes.

Example 4

Segmented Face Having Linear or Curved Segments

FIG. 9 is a cross-sectional view of a light directing construction 400 according to another aspect of the present invention. Light directing construction 400 includes a light directing film 410 having a smooth surface 412 and a structured surface 414. Light directing film 410 is oriented similar to the orientation shown in FIG. 2, with the y-axis extending across the structure from left to right in the figure, and the z-axis extending top to bottom of the figure. The x-axis extends into the page.

Light directing film 410 includes a plurality of prisms 440 having a first prism face 442 and a second prism face 444 that define valleys 443 and peaks 445. Smooth surface 412 is adjacent substrate 420. Overlying light direction film 410 is a metal coating 430 and a diffuser layer 435 having a low concentration of glass or polymeric beads 436 to mask artifacts and defects.

First prism face 442 includes at least two sections, with adjacent sections, if linear, having different slopes, or if curved, having different curvature or different center of curvature. It is possible to have two different curvatures with different centers of curvature such that the curves blend smoothly with no discontinuity in the first derivative at their junction point.

The various sections of first prism face 442 can be formed by a single diamond bit having multiple faces or segments on the diamond; the segments can be blended arc segments, straight segments, or a combination. Alternately, a diamond bit having a single segment can be used to make multiple cuts, or the cuts can be made with multiple diamond bits having the same or different shaped diamonds. The at least two sections which form segmented first prism face 442 reflect collimated light into two or more separate peaks, depending on the number of sections.

In light directing construction 400, diffuser layer 435 not only masks any artifacts and defects, but also combines, or at least evens out, the individual reflected light peaks formed by segmented first prism face 442.

The sectioned facets of Example 4, similar to Examples 2 and 3, provide diffusion in the YZ plane. That diffusion, superimposed on the diffusion from volume diffuser layer 435 provides an additional degree of freedom to differentiate the diffusion widths in the XZ and YZ planes.

Diffusion in XZ Plane

In another aspect of the invention, the light diffusion in the orthogonal direction (XZ plane) can be designed by varying or oscillating the structure height (in the z-axis or in the z-direction) along the length of the structure or along each row, which is the x-direction. The structure height can be varied when making the master tool, by controlled coordinated motion of the diamond cutting bit in and out of the master tool surface as the tool progresses in the x-direction. The motion provides a pattern of hillocks, which in turn provides variably sloped surfaces that diffuse light. The precise shape of the hillocks determines the specific diffusion profile. The wavelength of the hillocks, or other shaped structure, is generally 10 to 1000 micrometers. The amplitude is generally 0.1 to 10 micrometers, and often about 1 micrometer to 8 micrometers.

In one method of this invention, a fast tool servo or fast servo tool (FTS) actuator can be used to move the tip of the diamond cutting bit in the z-direction as the tool progress in the x-direction. The cross-sectional shape or area of the structures in the YZ plane, such as the orientation shown for Examples 1 through 4 in FIGS. 3 through 9, can be any orientation, whether or not illustrated in the Examples.

Figure 10B:
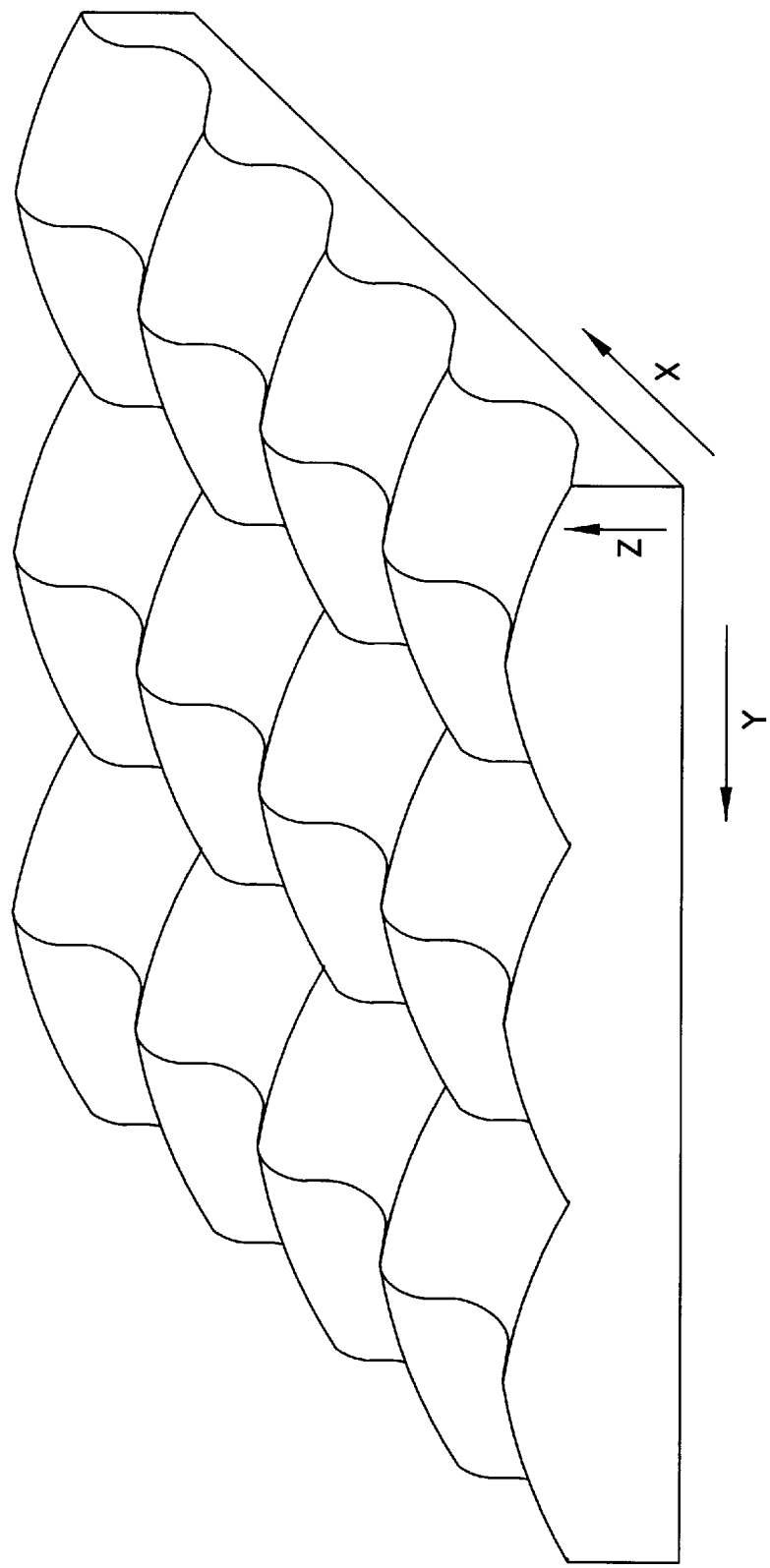
FIG. 10B is a schematic perspective view of a fifth embodiment of a light directing film according to the present invention.

Schematic drawings of light directing films having the structure height vary along the length of the structure in the x-direction are shown in FIGS. 10A and 10B. In FIG. 10A, the cross-sectional area of the structures in the YZ plane is similar to that of light directing film 310 of FIG. 6, except that in FIG. 10A, the structure is defined by a sinusoidal pattern in the x-direction. FIG. 10B, the structures also vary in a sinusoidal pattern along the x-direction.

Examples 5, 6 and 7

Z-Axis Oscillation With Regular Periodic Motion

Examples 5, 6, and 7 were produced by heat forming a 250 micron (micrometer) thick (10 mil) acrylic film on a structured copper tool under heat and pressure. The copper tool had been patterned as described generally above with a curved-edge diamond bit. The curved edge of the diamond bit had been lapped and polished into a single arc section from a circle having a radius of 430 microns (micrometers). For each example, the diamond was oriented to cut a thread-facet having mirror angle, also known as the nominal center slope, of 6 degrees and slopes of 6 (±1 to 3) degrees at the boundaries with the neighboring threads.

The length of the arc intercepted between the diamond bit and the copper tool surface determined the boundary slopes. Hence, the combination of the thread pitch and the curvature of the diamond cutting edge determined the boundary slopes. The surface relief height along the cutting or x-direction was defined by $Z = A \sin(2\pi x/\lambda)$, where A and $\lambda$ are the amplitude and wavelength in micrometers. "x" is the position along the x-axis.

The specific prism and facet dimensions for Examples 5, 6 and 7 are provided in Tables 1 and 2 below; all measurements are provided in micrometers.

The acrylic film having the prismatic structure thus provided a light directing film. This light directing film was coated with a layer of opaque silver (such as metal coating 330 of FIG. 6). A clear PSA was then pressed onto the silvered side and samples were cut and laminated to glass microscope slides.

Figure 11:
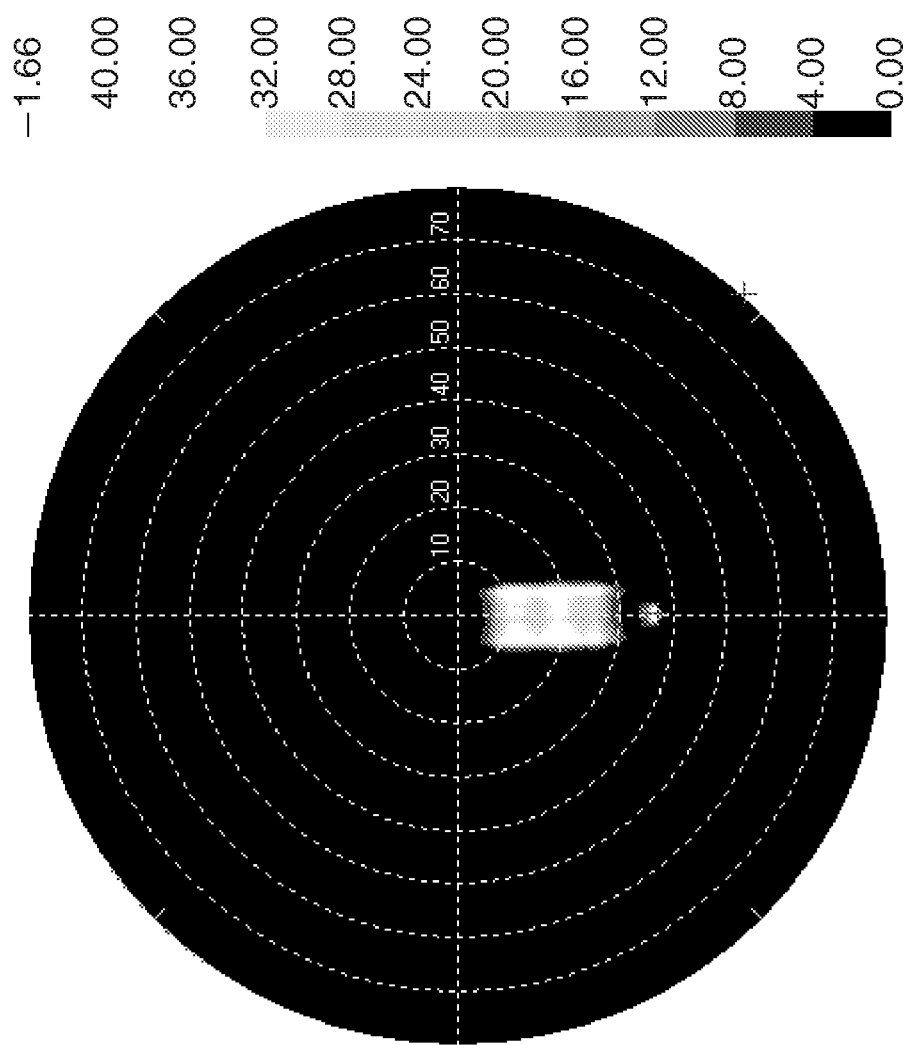
FIG. 11 is a graphical representation of the reflected light intensity of the light directing film of Example 5 as measured on an ELDIM EZ Contrast model 160R used in the reflective mode with 34 degree incident collimated light.
Figure 12:
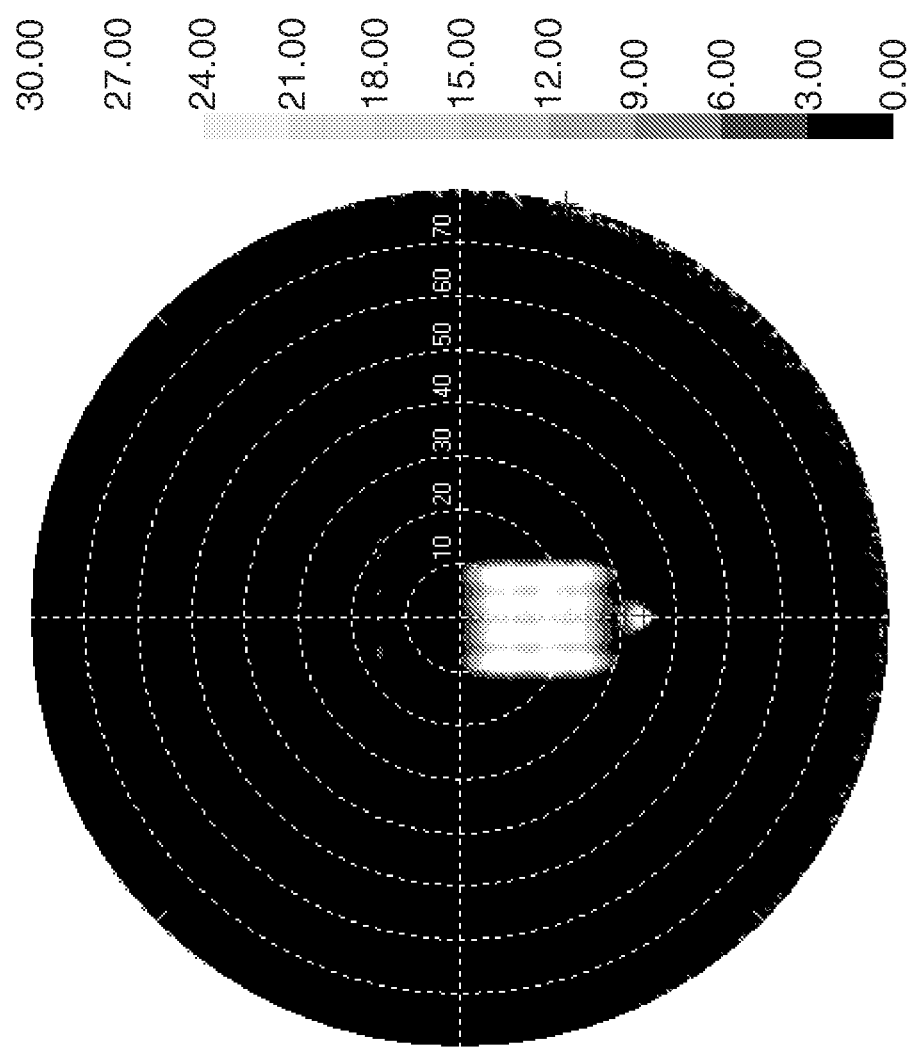
FIG. 12 is a graphical representation of the reflected light intensity of the light directing film of Example 6 as measured on an ELDIM EZ Contrast model 160R used in the reflective mode with 34 degree incident collimated light.
Figure 13:
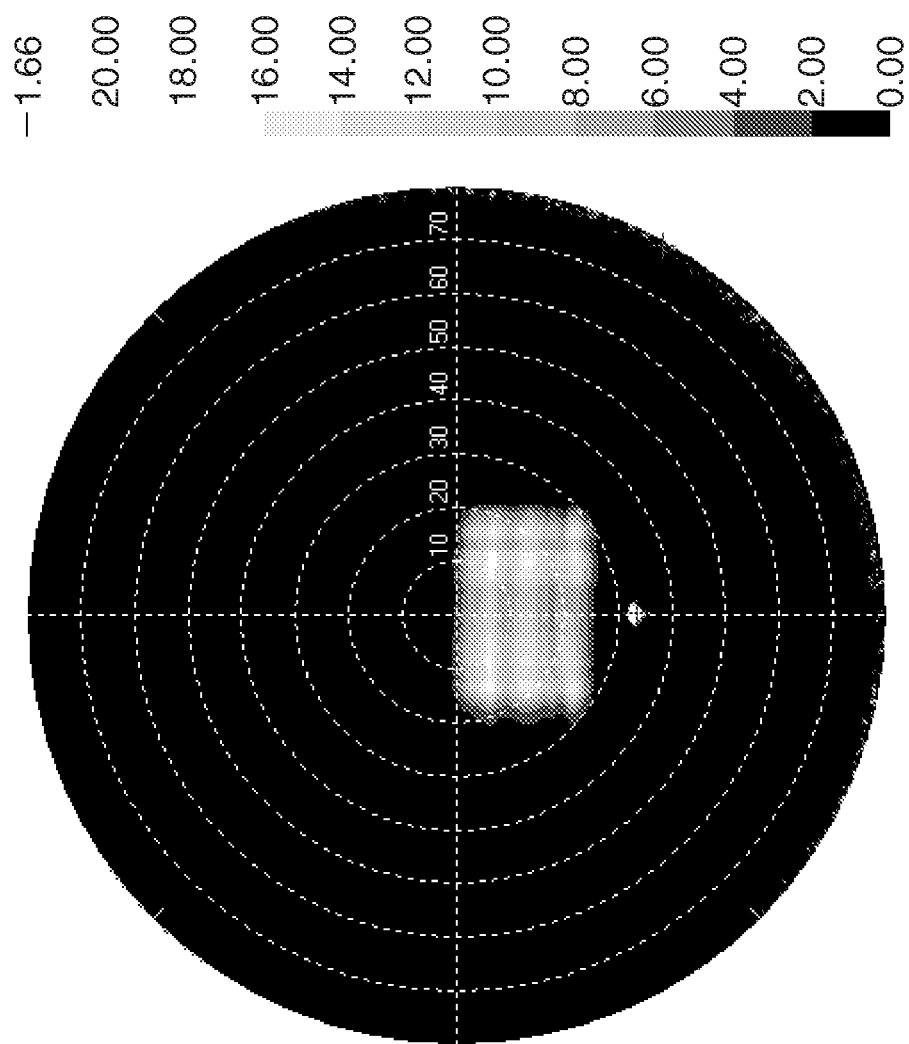
FIG. 13 is a graphical representation of the reflected light intensity of the light directing film of Example 7 as measured on an ELDIM EZ Contrast model 160R used in the reflective mode with 34 degree incident collimated light.

The samples were characterized with an ELDIM EZ Contrast model 160R used in the reflective mode with a 34 degree incident collimated light source and the resulting plots are shown in FIGS. 11, 12 and 13.

FIGS. 11, 12 and 13 illustrate diffusion profiles that are generally rectangular on a polar-angle plot; that is, the diffusion patterns have relatively straight edges. The plots theoretically provide a diffusion profile that is relatively constant versus the horizontal viewing angle, up to a specified horizontal angle of view (HAOV). That is, a top hat or square diffusion profile is provided in the horizontal view. Similarly, the diffusion profile is relatively constant versus the vertical viewing angle (VAOV), up to a specified vertical angle of view. Here also, a top hat or square diffusion profile is provided in the vertical view. Example 5 has a narrow horizontal angle of view pattern, as seen in FIG. 11, Example 6 has a medium horizontal angle of view pattern, as seen in FIG. 12, and Example 7 has a wide horizontal angle of view pattern, as seen in FIG. 13.

The specific diffusion pattern, in the horizontal angle of view, can be controlled by the ratio of the sinusoid amplitude and the wavelength, as seen in the comparison of Examples 5, 6 and 7.

Examples 8 and 9

Chaotic Z-Axis Oscillation Superimposed on Structure

Figure 14:
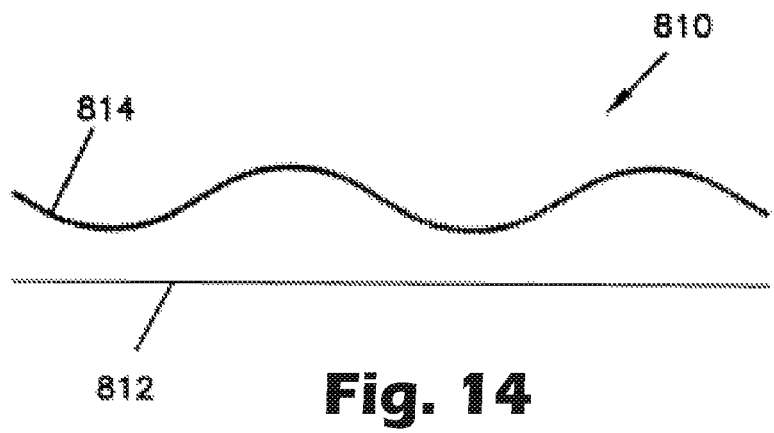
FIG. 14 is a schematic cross-sectional view of a sixth embodiment of a light directing construction according to the present invention.

FIG. 14 depicts a generic light directing film 810 having a smooth surface 812 and a structured surface 814. Structured surface 814 has a regular periodic surface that includes a noisy, chaotic or random microstructure superimposed on the regular periodic surface. The chaotic overlay may be random or quasi-random. The chaotic overlay provides a diffusive effect and hides visible defects; in some instances, the chaotic overlay may provide a matte finish to the display screen in which light directing film 810 is incorporated. The chaotic overlay also provides a grain appearance that ranges from small to large and from faint to coarse depending upon the frequency and amplitude of the noise.

The waveform wavelength and amplitude depend on the angle of diffusion desired and the distance from which the display or reflector will be viewed. The structures on the reflector surface should be smaller than naked human eye resolution at the viewing distance. For example, on a handheld display, the sizes that are most useful are less than the 2 arc-minute size at about 40 cm distance, or, less than 300 micrometers. For a front projection screen, viewed at a distance of 5 meters, the maximum structure size should be about 3-4 mm. In a near-eye application, that distance is much closer, and the allowable feature size would be that much smaller.

For a handheld display, the structures formed by the chaotic or random overlay generally have a size or wavelength of 2.5 micrometers to 250 micrometers, typically about 5 to 100 micrometers. The mean amplitude of the overlay is generally no greater than about 0.5 micrometers, and is generally no less than about 0.005 micrometers.

Light directing film 810 is oriented with the x-axis extending across the structure from left to right in the figure, and the z-axis extending top to bottom of the figure. The y-axis extends into the page. Thus, what is shown in FIG. 14 is a structure row extending from left to right across the page.

The signal to form the chaotic overlay is superimposed or electronically added on the signal to the cutting tool that forms the regular, periodic structure.

Examples 8 and 9 were prepared as disclosed in Example 5, except that Example 8 further included chaotic oscillation over the fundamental structure of Example 5 along the length of the composite row in the x-direction. Example 9 also included chaotic oscillation over the fundamental structure. The specific prism and facet dimensions for Examples 8 and 9 are provided in Tables 1 and 2 below.

Figure 16:
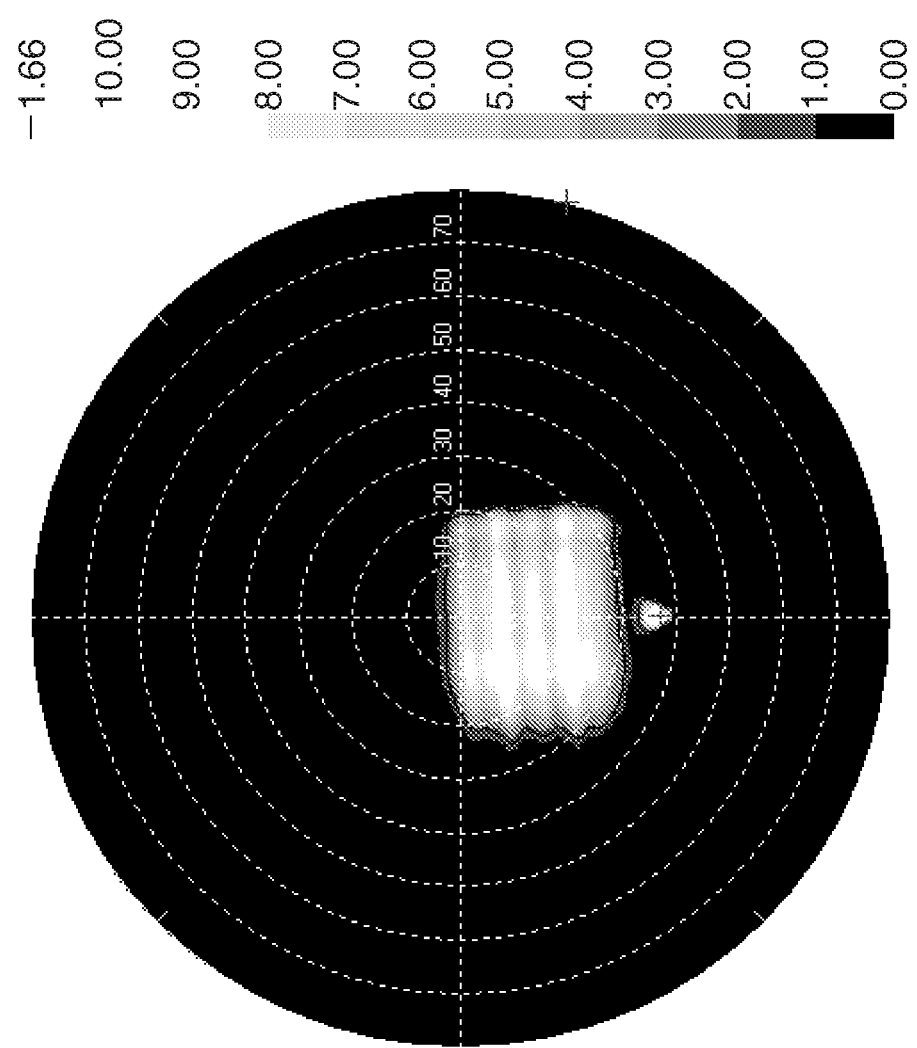
FIG. 16 is a graphical representation of the reflected light intensity of the light directing film of Example 9 as measured on an ELDIM EZ Contrast model 160R used in the reflective mode with 34 degree incident collimated light.

Examples 8 and 9 were characterized with an ELDIM EZ Contrast model 160R used in the reflective mode with a 34 degree incident collimated light source and the resulting plots are shown in FIGS. 15 and 16, respectively. The figures clearly show the sharp glare peak at 34 degrees and the broad reflected light. Example 9 has a wider vertical angle of view than Example 8, and a different centroid angle.

For Table 1, "A" represents the amplitude of the composite height changes along the x-axis. "λ" represents the repeating wavelength of the composite height changes along the x-axis. "Noise amplitude" is the root-mean-square of the amplitude of the chaotic, random structure superimposed on the regular structure. "HAOV" represents "horizontal angle of view"; the "T" follower designates "theoretical" and an "M" follower designates "measured". The HAOV is the full width at half maximum of the luminance slice through the maximum in the horizontal direction.

Table 1 shows that amplitude and wavelength (theoretical HAOV-T) predict HAOV-M. HAOV-T assumes no chaotic oscillation and is calculated from the amplitude and wavelength only. Example 8 illustrates the widening of HAOV-M from the value predicted by the sinusoidal pattern of Example 5 having no chaotic oscillation.

For Table 2, "pitch" represents the thread pitch, which is the distance, in the y-direction, between adjacent rows of prismatic structures. "Radius" is the radius of the diamond bit cutting edge. VAOV represents "vertical angle of view"; the "T" follower designates "theoretical" and the "M" follower designates "measured". The VAOV is the full width at half maximum of the luminance slice through the maximum in the vertical direction. "Gain peak" means the maximum gain. "Mirror angle" represents the angle of the facet face from the y-axis. "Centroid" or "centroid angle" represents the polar angle of the center of the reflected pattern.

Table 2 shows that the thread pitch, radius, and mirror angle predict the VAOV-M and the measured centroid angle.

Examples 10 and 11

Generalized Periodic Shapes

The previous examples have described sinusoidal periodic motion in the XZ plane. The present invention can be used with any fundamental waveform that can be programmed on a computer. The waveform may take the form of a well-known mathematical function or it can be programmed as a repeating set of values (X, Z). It may be desired to seek an optimal or application-specific diffusion pattern and choose a Z(X) waveform that provides the desired diffusion pattern.

Figure 17:
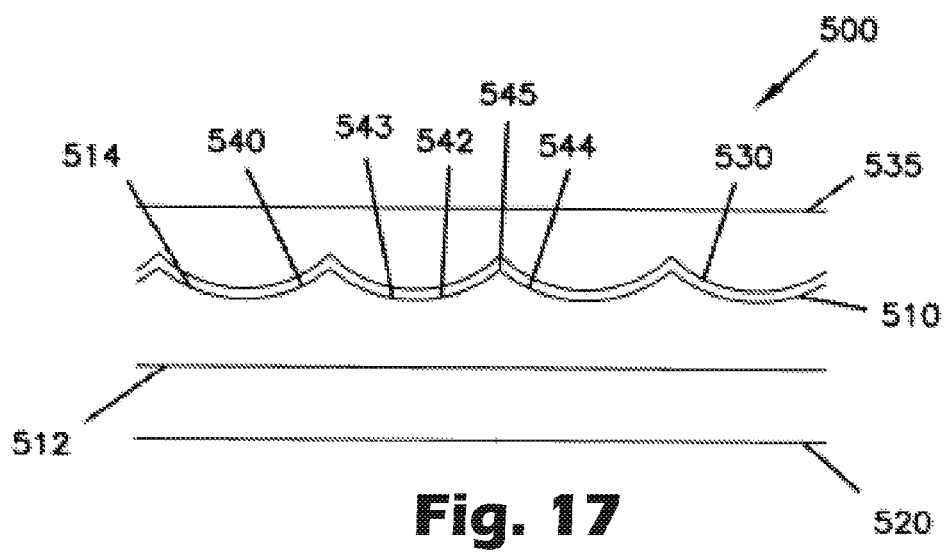
FIG. 17 is a schematic cross-sectional view of a seventh embodiment of a light directing construction according to the present invention.

FIG. 17 schematically shows Example 10 in a cross-sectional view of a light directing construction 500. The light directing construction 500, which includes a light directing film 510, is oriented in FIG. 17 with the x-axis extending across the structure from left to right in the figure, and the z-axis extending top to bottom of the figure. The y-axis extends into the page. Thus, what is shown in FIG. 17 is a structure row extending from left to right across the page.

TABLE 1

Horizontal Viewing Parameters

| Example | A (μm) | λ (μm) | Noise Amplitude (μm) | HAOV-M | HAOV-T |
|---|---|---|---|---|---|
| Comp. 1 | NA | NA | NA | 14.3 | NA |
| 3A | 0 | NA | 0 | 2.6 | 0 |
| 3B | 0 | NA | 0 | 12.1 | NA |
| 5 | 0.9 | 133 | 0 | 13.5 | 14.6 |
| 6 | * | 240 | 0 | 20.4 | * |
| 7 | 1 | 71 | 0 | 37 | 30 |
| 8 | 0.9 | 133 | 0.25 | 47.5 | 14.6 |
| 9 | 1 | 71 | 0.1 | 38 | 30 |

"NA" - indicates not applicable.
"*" - indicates value was not available.

TABLE 2

Vertical Viewing Parameters

| Ex. | Pitch | Radius | VAOV-M | VAOV-T | Gain Peak | Mirror Angle | Centroid-M | Centroid-T |
|---|---|---|---|---|---|---|---|---|
| Comp. 1 | 50 | NA | 13.7 | NA | 23.6 | 6 | 16.9 | 16 |
| 3A | 50 | 428 | 21 | 20.0 | 170 | 6 | 16.9 | 16 |
| 3B | 50 | 428 | 22.4 | 20.0 | 18 | 6 | 16.9 | 16 |
| 5 | 61 | 428 | 21.1 | 22.8 | 26 | 6 | 15.8 | 16 |
| 6 | 50 | 428 | 19.8 | 20.0 | 25 | 6 | 16.9 | 16 |
| 7 | 61 | 428 | 21.8 | 24.3 | 15 | 6 | 14.7 | 16 |
| 8 | 50 | 428 | 19.3 | 20.0 | 1206 | 6 | 16.6 | 16 |
| 9 | 78 | 428 | 27.4 | 31.0 | 12 | 7.5 | 10.9 | 11.5 |

"NA" - indicates not applicable.

Light directing film 510 has a smooth surface 512 and a structured surface 514, which includes a structure or prism 540 having a front face 542 and a back face 544. Front face 542 and back face 544 meet at a valley 543 and a peak 545. In this embodiment, front face 542 and back face 544 are the same; that is, back face 544 is a mirror image of front face 542. Front face 542 and back face 544 are defined by a set of points that describe an upright parabola. Structured surface 514 comprises a plurality of attached adjacent parabolas that provides a surface having a scalloped look.

Smooth surface 512 of film 510 is adjacent substrate 520. Overlying light direction film 510 is a metal coating 530 and a diffuser layer 535, which can be volume diffused to soften the diffusion profile and to mask any artifacts and defects.

Scalloped structured surface 514, specifically faces 542, 544, are formed by varying the depth of the diamond cutting bit during the machining of the master tooling. A fast servo tool (FTS) actuator is used to move the tip of the diamond cutting bit in the z-direction as the tool progress in the x-direction. In this embodiment, the depth modulation is periodic, but could include a chaotic overlay.

The embodiment of Example 10 and FIG. 17 reflects collimated light into a top hat or square-shaped reflected light distribution. This is due to the equal spatial weight given to front face 542 and back face 544. Front face 542 and adjacent back face 544 define a parabola, which is defined by the equation $Y=CX^2$, the slope being $2CX$ and the valley 543 being $X=0$. Using this equation for the prisms, the reflected light angle is equal to the incident angle plus $4CX$. For small values of a $\tan(2CX)$, the intensity of light reflected into each direction within the HAOV, is constant. Hence, the intensity versus angle takes on top hat shape. In some instances, arcs or sinusoids may provide approximations to the flat or top hat shape.

Figure 18:
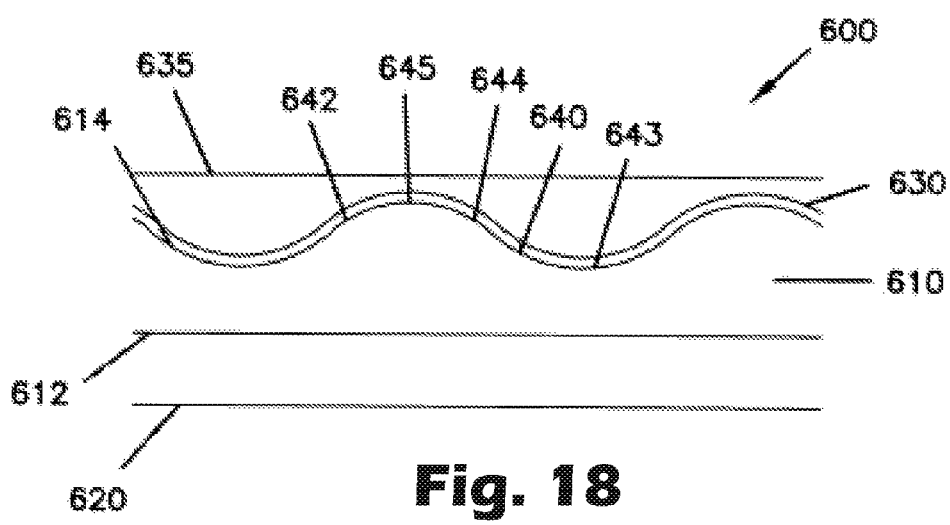
FIG. 18 is a schematic cross-sectional view of an eighth embodiment of a light directing construction according to the present invention.

FIG. 18 is a schematic cross-sectional view of a light directing construction 600, Example 11, according to yet another aspect of the present invention. Light directing construction 600 is oriented similar to light directing construction 500 of FIG. 17, with the x-axis extending across the structure from left to right in the figure, and the z-axis extending top to bottom of the figure. The y-axis extends into the page. Thus, what is shown in FIG. 18 is a structure row extending from left to right across the page.

Light directing construction 600 includes a light directing film 610 having a smooth surface 612 and a structured surface 614, which includes a prismatic structure 640 having a front face 642 and a back face 644. Front face 642 and back face 644 meet at a domed peak 645. Front face 642 and back face 644 are the same; that is, back face 644 is a mirror image of front face 642. Each of front face 642 and back face 644 are made of a concave segment and a convex segment. Additionally or alternately, the entire structured surface 614 has an alternating pattern of concave and convex segments.

Structure surface 614 is formed by the same techniques used to form structured surface 514 of Example 10 in FIG. 17, except that in Example 11, the set of periodic points describes a set of two parabolas, where one parabola is inverted in respect to the other, and the intersection point is blended.

This structure is also formed by using a fast servo tool (FTS) actuator to move the tip of the diamond cutting bit in the z-direction during machining of the master tool. The reflected light pattern from structured surface 614 is the same as that of Example 10.

Similar to the previous examples, smooth surface 612 is adjacent substrate 620. Overlying light direction film 610 is a metal coating 630 and a diffuser layer 635, which is used to mask defects.

Examples 12 and 13

Figure 19:
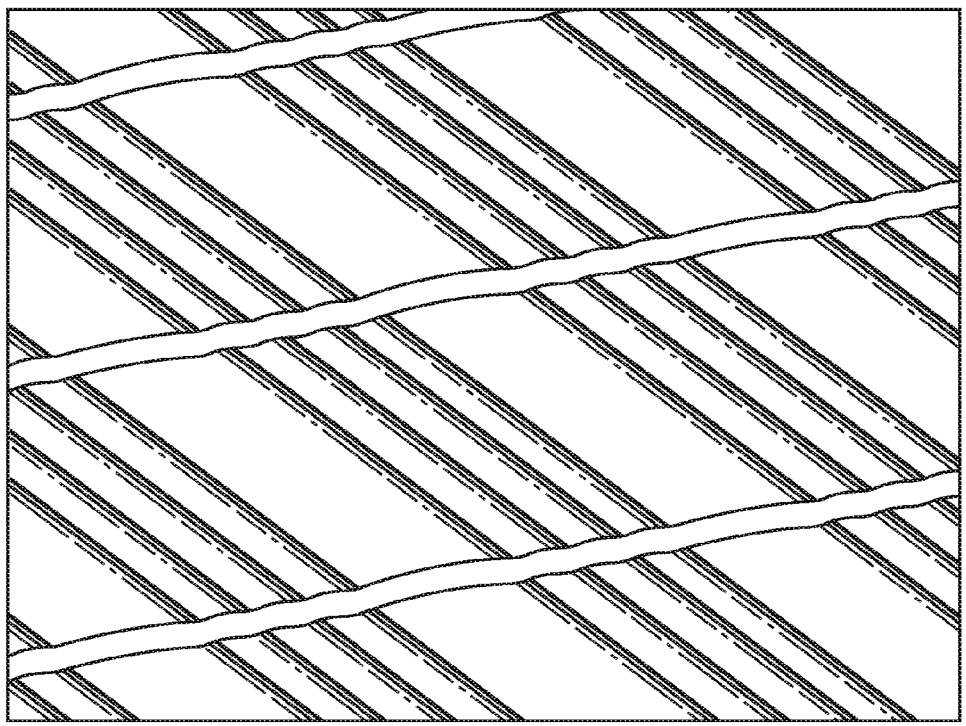
FIG. 19 is a schematic perspective view of a ninth embodiment of a light directing film of the present invention when viewed under a scanning electron microscope.
Figure 20:
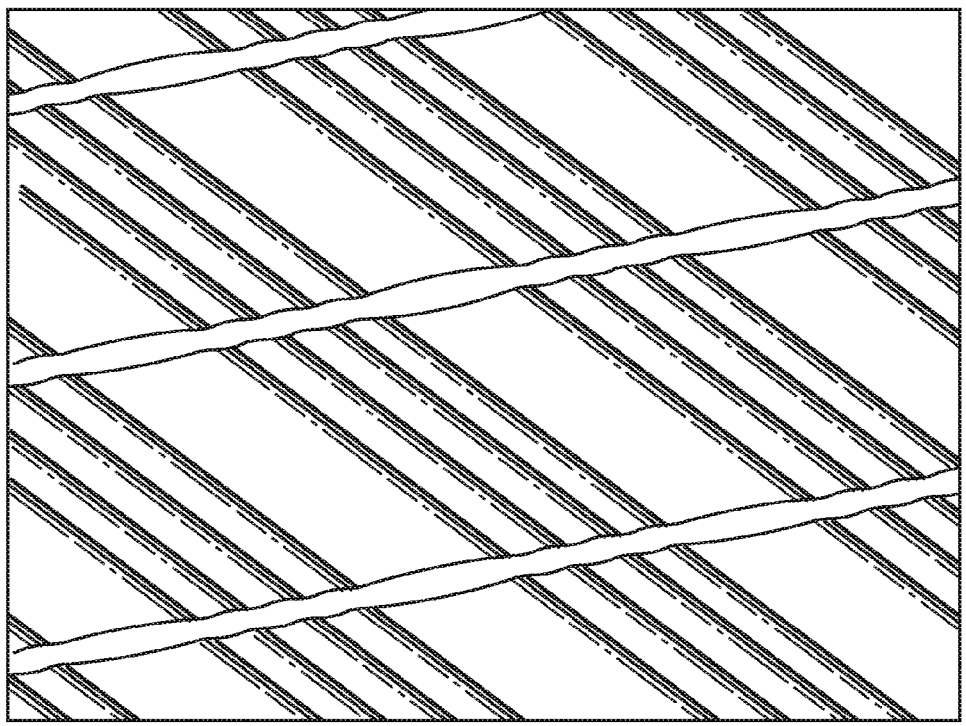
FIG. 20 is a schematic perspective view of a tenth embodiment of a light directing film of the present invention when viewed under a scanning electron microscope.

Examples 12 and 13 are shown in the illustrations of FIGS. 19 and 20, respectively. The illustrations represent the light directing film positioned at a 30 degree tilt in order to show the various features of the structured surface. The structure row, which is the x-direction, runs 30 degrees from horizontal, as shown in the illustrations. Each of Examples 12 and 13 was prepared by the general following procedure. The Examples differed in the modulation in the height of the structures, i.e., the z-direction. The specific amplitude, pitch, and wavelength were the same between Examples 12 and 13, although it is understood that these characteristics could be varied as desired.

For Examples 12 and 13, the pitch between adjacent structure rows (measured in the y-direction) was 61 micrometers. The facet was at a 6 degree tilt. The wavelength of the sinusoidal surfaces (measured in the x-direction) was 71 micrometers; the various angles of the sinusoidal surfaces are noticeable by the striated surfaces of the structures visible in the figures. Examples 12 and 13 differ from each other in that for Example 12 in FIG. 19, the modulation in the z-direction is synchronous. That is, for Example 12, the modulation in the z-direction of adjacent structures was aligned. An example of synchronous alignment is shown schematically in FIG. 10A. For Example 13 in FIG. 20, the modulation of adjacent structures was offset by 180 degrees, creating an anti-synchronous pattern. Thus, when the first structure had a peak, the adjacent structure had a valley, and vice versa. An anti-synchronous pattern cancels out or at least masks or hides defects in the structures. Although the offset of Example 13 was 180 degrees, it is understood that other offsets, such as 90 degrees, 45 degrees, and others, can be used. Randomly varying offsets can also be used.

One method for making asynchronous wave pattern is by digital manipulation of the FTS wave-shape. Generation of a waveform, for example, one that is nearly perfectly a sine wave, results from the digital specification of multiple points of a computer algorithm. A nearly perfect sine wave can be generated from a discrete number of points "n". Asynchronous wave shapes can be obtained by randomly eliminating one (or more) of the "n" steps in the wave. The most logical point in the wave to do this random elimination is where the slope of the actual wave form is varying the least.

The elimination of the segment may be accomplished by pre-calculating the total number of the wave shapes generated ("m"), then using the computer random number generator to build a table of random numbers in the range of 1 (the first wave generated) to "m" (the last wave generated). The size of the table will depend on how many waves will be treated by the elimination process. The elimination of discrete points causes small changes in the wave length to result in random anti-synchronous waves. The pattern of waves formed in the above method can be another way of hiding spot-type defects of small size and reducing or eliminating moiré fringes from regular interference with pixel elements.

Reducing Moiré Interference

In yet another aspect of the invention, the structure spacing can be designed to minimize moiré interference with the pixel pitch of the LCD. In most applications of the light directing film into a display apparatus, the structure rows, which run in the x-direction, are positioned horizontally across the display screen; the y-direction is vertical across the display screen. For example, in a hand held computing device, the structure rows would extend from the left edge to the right edge. Moiré interference is caused by the structures being aligned with the pixels, either in the x-direction or the y-direction.

Example 14

Non-Linear Rows

Figure 21:
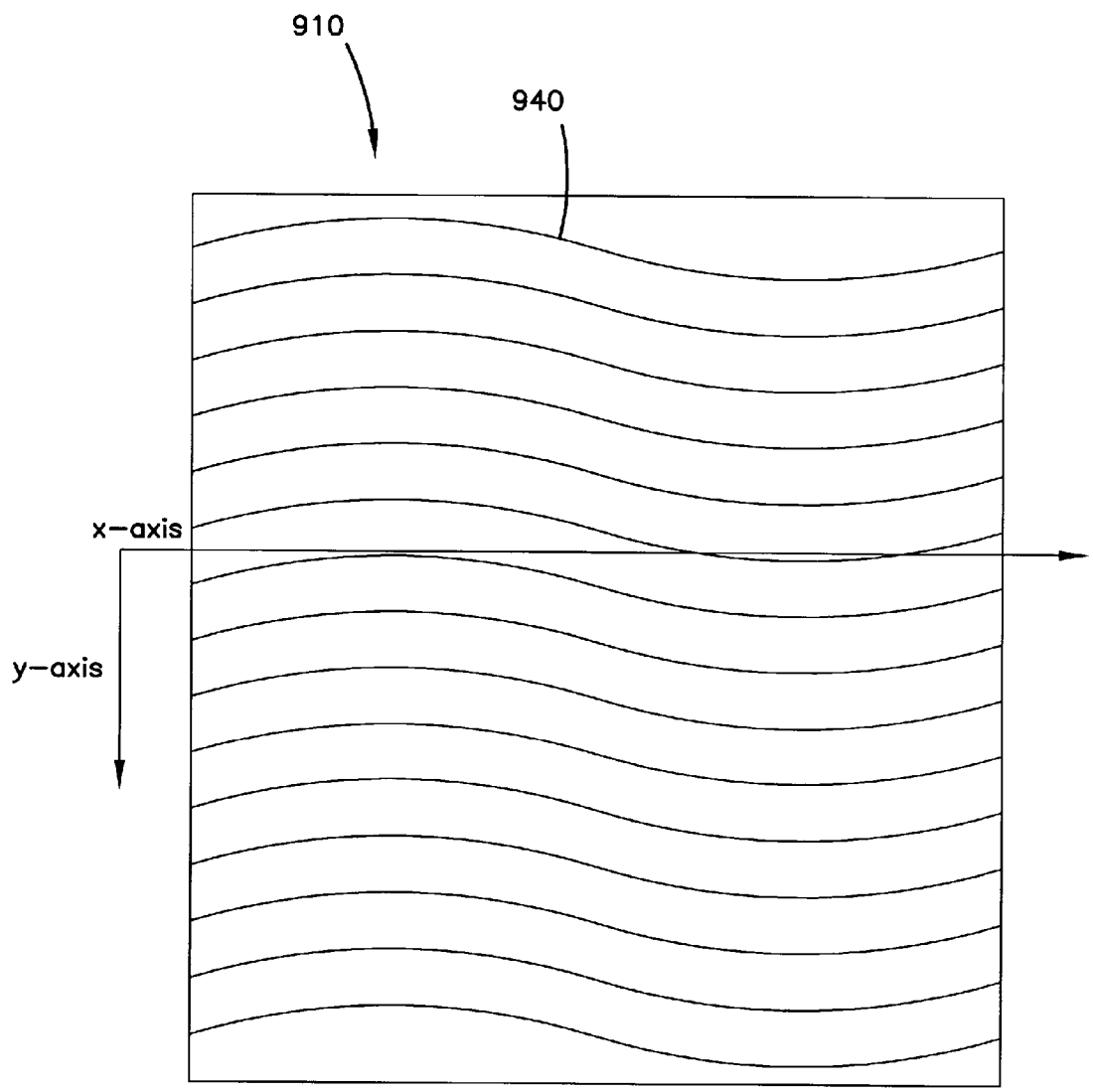
FIG. 21 is a schematic top plan view of a light directing film according to another aspect of the present invention.

Example 14, in FIG. 21, is a light directing film 910 having a plurality of prismatic structures 940. Unlike the structures of the previous examples, structures 940 are not linear; rather, structures 940 follow a wavy path in the XY plane. Structures 940 extend in the x-direction, but include a y-direction component. The oscillating line of structures 940 decreases moiré interference by minimizing, preferably eliminating, alignment of structures 940 with the display pixels.

Structures 940 can be formed by oscillating the cutting tool in the y-direction during machining of the master tool. In another method, structures 940 can be formed by rotating the cutting tool around its central axis, or another axis, during machining of the master tool.

Example 15

Varied Row Spacing

In an alternate embodiment to reduce moiré interference, spacing between rows of composites can be varied. For example, the distance in the y-direction between peaks of composite rows can be varied. When made by a cylindrical machining technique, this may create grooves that are not parallel.

Example 16

Rotated Orientation

It is also possible to rotate or otherwise orient the light directing film so that the row of composites, along the x-axis, is not parallel to the rows of pixels in the display apparatus. Typically, the rows of pixels run horizontal across the display. The rotation of the composite rows can be 1 to 45 degrees, generally is 5 to 20 degrees, and preferably is 5 to 10 degrees from the pixel row orientation.

Example 17

Effect of Volume Diffuser

Example 17 shows the effects of providing a volume diffuser over the light directing film, which includes reducing or eliminating moiré interference. Example 17 was made by laminating a 12 micrometer thick layer of 8% volume diffuser (PSA loaded with 8% polymeric beads) to the structure of Example 5.

Table 3, below, compares Example 17 with Comparative Example 1, which had flat facets and a 25 micrometer thick, 8% loaded diffuser layer, and with Example 5, which had no volume diffuser layer.

For Table 3, "HAOV" represents the horizontal angle of view and "VAOV" represents the vertical angle of view. "HAOC" represents the horizontal angle of curtaining, which is the angular separation between 90% and 10% of the maximum luminance in the XZ plane. "VAOC" represents the vertical angle of curtaining and is likewise measured but in the YZ plane. The angle of curtaining determines how abruptly the reflected light pattern appears when one rotates the LCD under illumination.

Periodic repetitive structures can defract light into repetitive bands of color. For structures having a wavelength on the order of 50-100 micrometers, the diffraction band color bands are faint, but still visible, because it is only the higher order diffraction effects that are expressed.

"Visible structures" refers to whether or not the prismatic structures were visible with a naked eye. For Example 5, faint grooves at a pitch of 133 micrometers were observed. For Comparative Example 1 and Example 17, no grooves are seen, at least partially due to the presence of the volume diffuser.

Figure 22:
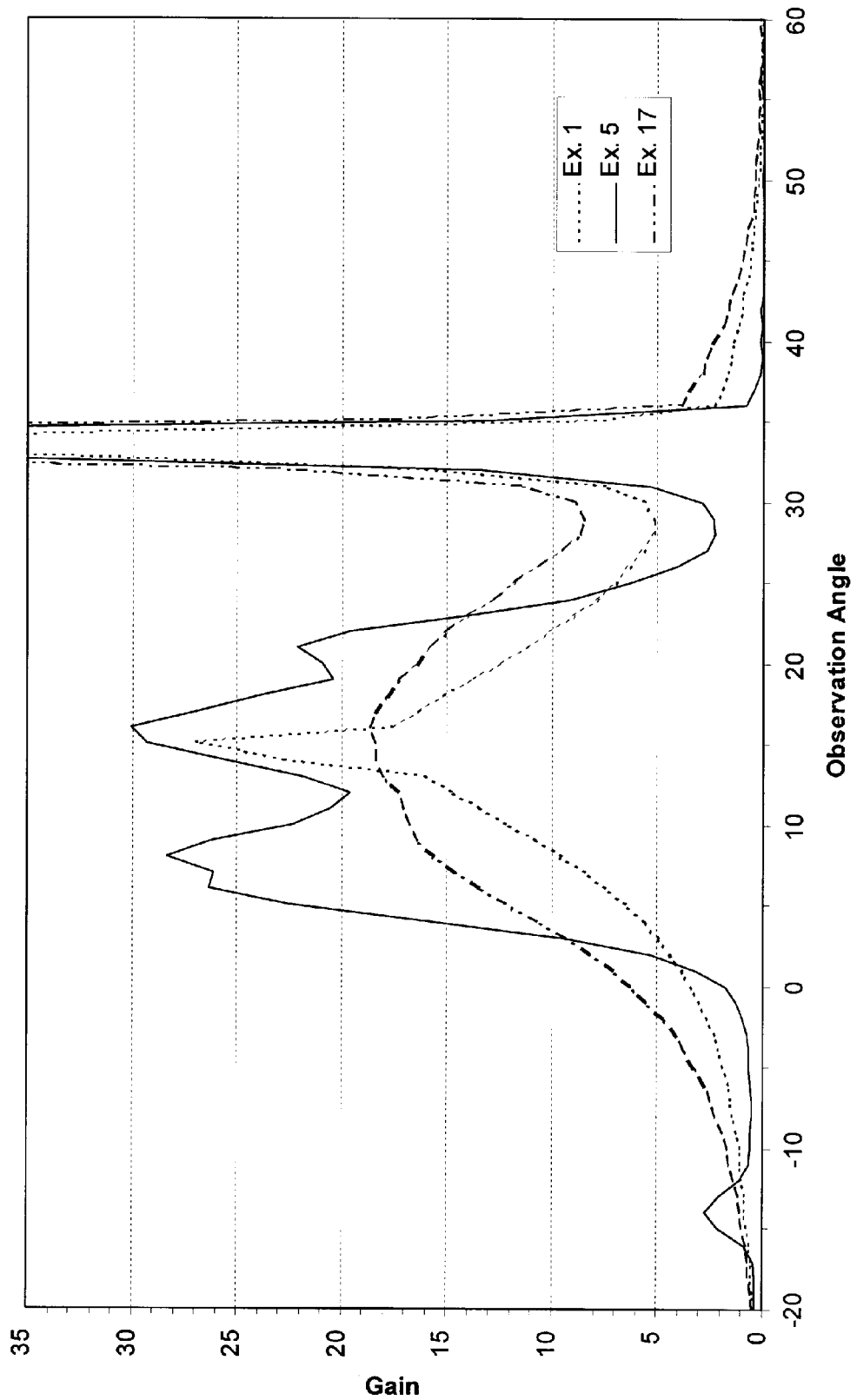
FIG. 22 is a graphical representation of the cross-sectional view of the reflected light intensity of the light directing film of Examples 1, 5 and 17 as measured on an ELDIM EZ Contrast model 160R used in the reflective mode with 34 degree incident collimated light.

FIG. 22 shows a cross-sectional view plot of the light reflectance from Examples 1, 5 and 17 as measured on an ELDIM EZ Contrast model 160R used in the reflective mode with a 34 degree incident collimated light source. The plot shows that for Comparative Example 1, there is a moderately strong image of the light source, which is observed as a sharp peak in the ELDIM plot. Example 5, which has XZ plane diffusion designed in to the structure, provides an uneven or unlevel gain across the observation angle, which could occur from an imperfectly radiused diamond tool; this would result in an unevenly lighted display, with bright and dim spots. Example 17, which includes the volume diffuser over the structure of Example 5, provides a smoother, more even distribution.

Samples that have a wider angle of view, on the order of 30 degrees, such as Example 17, have a relatively less gain decrease caused by the application of a volume diffuser layer, generally 30% or less. Samples with a narrow angle of view, on the order of less than 10 degrees, have a much greater decrease in gain when the diffuser is added, more typically about 60% change.

Examples 5 through 17, described above, demonstrate novel diffuse reflective patterns that can be obtained using a single diamond bit cutting tool and FTS. The diamond cutting tool surface provides prismatic grooves having a main curved reflective facet and a secondary riser facet, as observed in the YZ plane cross-section. The surface curvature in the YZ plane provides a controlled, diffuse, angular extent in the YZ reflectance plane. The curvature or slope in the XZ plane provides a controlled, diffuse, angular extent in the XZ reflectance plane. The reflectance pattern is continuous in the polar plot, and is described by a peak and a half width.

The "repeat cell" of the tool surface is the minimum area of the tool that reproduces the reflected light pattern of the entire tool surface. In Examples 5 through 17, the reflected pattern

TABLE 3

| Example | Diffraction band | Structure Visibility | Pixel Moiré | Source Visibility | Gain | HAOV | VAOV | HAOC | VAOC |
|---|---|---|---|---|---|---|---|---|---|
| Comp. 1 | none | None | none | moderate | 23.6 | 14.3 | 13.7 | 15.9 | 15.7 |
| 5 | moderate | Faint | moderate | little | 26 | 13.5 | 21.1 | 3 | 5 |
| 17 | none | None | none | none | 19 | 18.5 | 25 | 16 | 17.6 | is contiguous in the polar plot, because there are no discontinuities in the slopes of the curved facet shape and the FTS waveform.

The Examples described above fall within two distinct types of microreplicated structures: Examples 2 and 3, illustrated in FIGS. 5 and 6, are those having generally a first, reflective face, and a second, generally unused face generally called the riser, joined at a point where the slope is discontinuous; and Examples 8, 9 and 11, illustrated in FIGS. 14 and 18, are those formed by FTS and having prisms with generally continuous slope. These conditions lead to a single region of reflected light, that is, a single continuous area of luminance on the polar plot of reflected light, for example, as illustrated in FIGS. 4, 8, 11-13, and 15-16.

Example 4, illustrated in FIG. 9, has a first reflective face having multiple facets. The boundary between two facets is defined as a point of discontinuous slope. It has been found that a single facet on the reflected face provides a single region of reflected light on the polar plot of reflected light, whereas multiple facets on the reflected face generally provide multiple regions of reflected light, which may be distinct or overlapping. Addition of a diffuser will soften the boundaries of the regions.

Examples 18-29

Multiple Reflectance Regions

Examples 18 through 29, below, depict various multifaceted, microreplicated structures that provide multiple regions of light reflectance. To provide multiple regions of light reflectance, the light directing microreplicated structures form a curved surface having multiple facets defined by discontinuous slope. The surface of each facet determines the pattern or shape of the resulting individual regions of light reflectance and the sum of all the facets completes the overall reflectance pattern.

The majority of the Examples described above in Examples 1-17 provide a reflectance pattern having a single region of light reflectance; that is, the repeat cell of the light directing microreplicated structure has a single flat or curved facet.

Figure 23A:
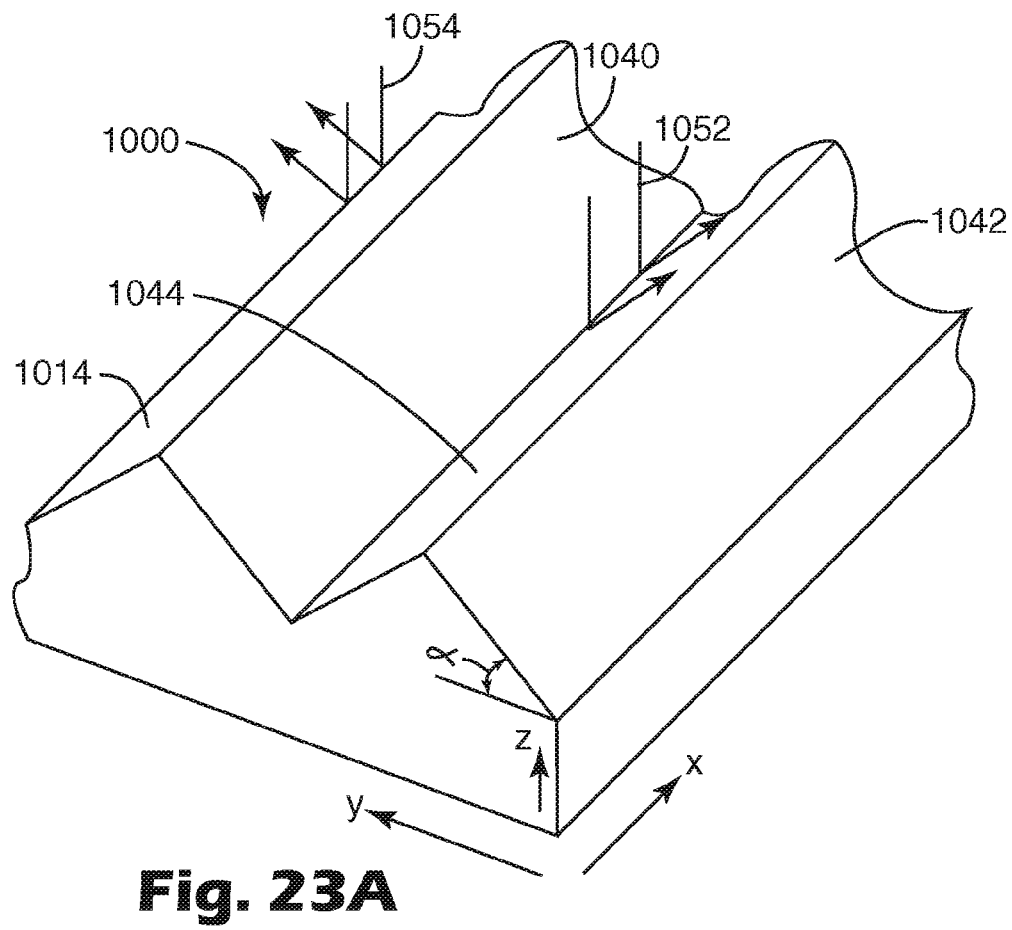
FIG. 23A is a schematic perspective view of an eleventh embodiment of a light directing film according to the present invention.

Example 18, schematically illustrated in FIG. 23A, illustrates a light directing film 1010 having a structured surface 1014 that includes a plurality of triangular prisms 1040. Triangular prisms 1040 are isosceles triangular prisms, having a first prism face 1042 and a second prism face 1044. Each of prism faces 1042, 1044 forms an angle α with respect to the y-axis. These prism faces can also be referred to as facets or reflective facets. First prism face 1042 and second prism face 1044 are flat or straight, meaning, there is essentially no curvature associated with either first face 1042 or second face 1044. Prisms 1040, and thus faces 1042, 1044, extend along the x-direction of film 1010. The height of each prism 1040, that is, the dimension of prism 1040 in the z-direction, is constant along the x-direction.

Figure 23B:
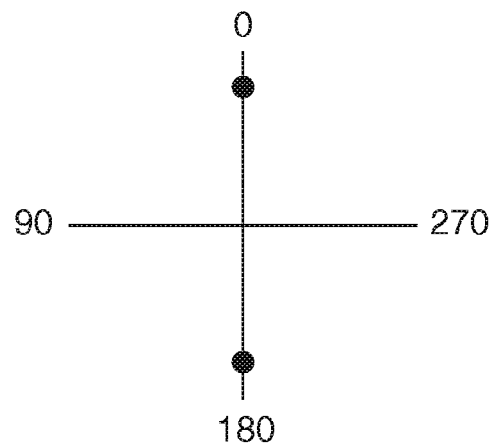
FIG. 23B is a schematic, graphical representation of the reflected light intensity of the light directing film of Example 18 when illuminated with normally incident collimated light.

The expected light reflectance from film 1010 of Example 18, when illuminated with normally incident collimated light, is illustrated in FIG. 23B. The reflected light forms a pattern having two symmetric reflectances in the 0-180 azimuth plane, at a polar angle of approximately 2nα, where α is the inclination angle of prism faces 1042, 1044 and n is the refractive index of any protective polymer coating. The rays 1052 reflecting off first prism face 1042 create one reflectance and the rays 1054 reflecting off the second prism face 1044 create the second reflectance.

If the light rays are reversed, one can see that light incident from directions defined by the reflectance pattern will be reflected in to the normal direction, which is the origin of the polar plot (FIG. 23B). This shows that some light originating from these oblique regions will be reflected and reach the viewer, usually positioned and observing normal to the surface.

Figure 24A:
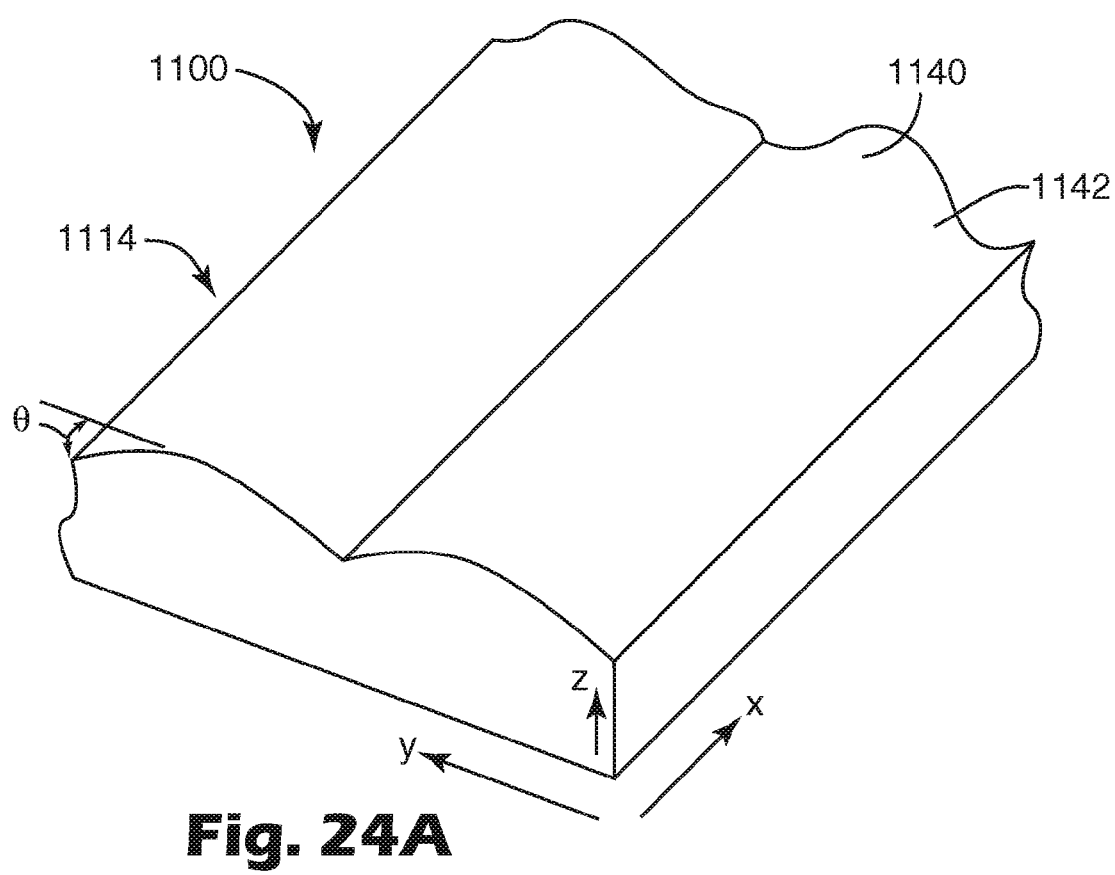
FIG. 24A is a schematic perspective view of a twelfth embodiment of a light directing film according to the present invention.
Figure 25A:
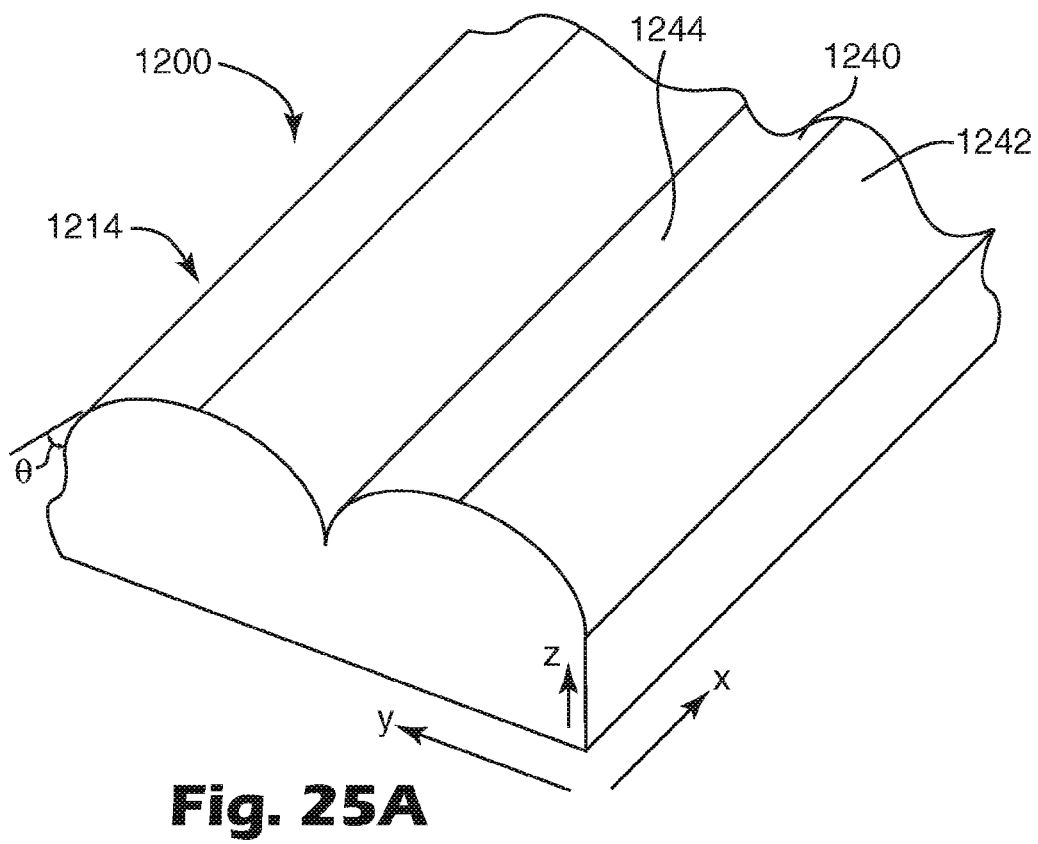
FIG. 25A is a schematic perspective view of a thirteenth embodiment of a light directing film according to the present invention.

Examples 19 and 20, illustrated in FIGS. 24A and 25A, respectively, are light directing films having curved prism faces or facets. Example 19, illustrated in FIG. 24A as light directing film 1100, has a structured surface 1114 comprising prisms 1140 having one prism face 1142. Prism face 1142 is a smooth, continuous arc, not having a discrete tip or point. Example 20, illustrated in FIG. 25A as light directing film 1200, has a structured surface 1214 comprising prisms 1240, prisms 1240 having a first prism face 1242 and a second prism face 1244. Valley 1243 separates individual prisms 1240. Prisms 1140, 1240, and thus faces 1142, 1242, 1244 extend along the x-direction of film 1100, 1200. The height of each prism 1140, 1240, that is, the dimension of prism 1140, 1240 in the z-direction, is constant along the x-direction.

Each of prism faces 1142, 1242, 1244 are curved, formed by a single diamond bit having a curved cutting surface. Alternately, prism faces 1242 and 1244 could be simultaneously cut by a double or dual-diamond bit, each diamond bit cutting a prism face. That is, prism face 1242 would be formed by a first diamond cutting bit and prism face 1244 would be formed by a second diamond cutting bit. Typically these two cutting bits would be connected to one another or separated by an additional increment equal to multiple prism pitches.

Figure 24B:
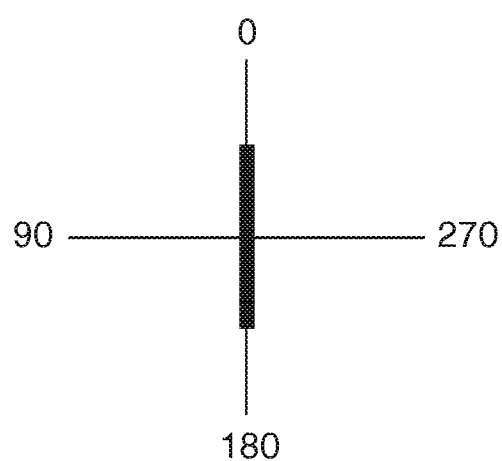
FIG. 24B is a schematic, graphical representation of the reflected light intensity of the light directing film of Example 19 when illuminated with normally incident collimated light.
Figure 25B:
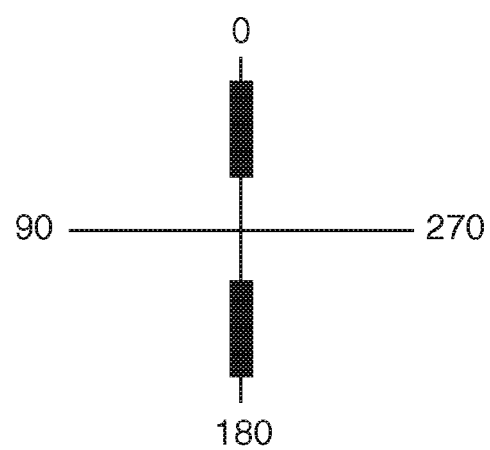
FIG. 25B is a schematic, graphical representation of the reflected light intensity of the light directing film of Example 20 when illuminated with normally incident collimated light.

The resulting expected light patterns for normally incident collimated light off from films 1100, 1220 are illustrated in FIGS. 24B and 25B. For both Examples, the light patterns are lines along the 0-180 azimuth plane through polar angles 2nθ, where θ is the angle of the tangent to prism face 1142, 1242, 1244, and n is the refractive index of any protective polymer coating. In FIG. 24B, film 1100, with the single arc, is shown as spreading light symmetrically across the center of the plot. For film 1200, FIG. 25B shows the two-facet structure providing two discrete lines of light reflectance positioned symmetrically around the center of the plot. The gap between the two discrete reflectances is based on the discontinuity of the slope between facets 1242 and 1244. Specifically, it is equal to 2nΔθ, where Δθ is the difference between the surface angles along the path perpendicular to the intersection line of facets 1242 and 1244.

Figure 26A:
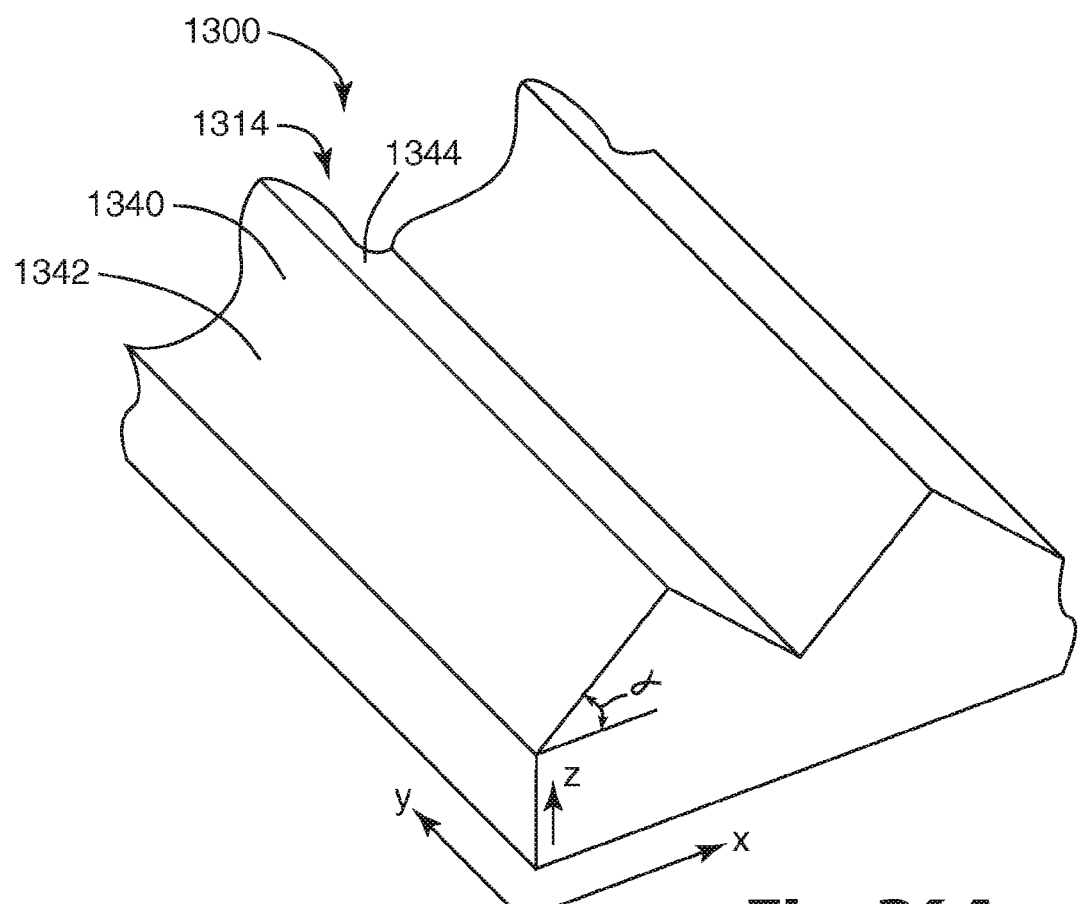
FIG. 26A is a schematic perspective view of a fourteenth embodiment of a light directing film according to the present invention.

Examples 21, 22 and 23 show films having surfaces generated by FTS motion and with a flat diamond cutting bit. Example 21, illustrated in FIG. 26A, is film 1300 having structured surface 1314 which comprises prisms 1340. Prisms 1340 have a first prism face 1342 and a second prism face 1344. Film 1300 is similar to film 1000 of FIG. 23A, except that in film 1300, prisms 1340, and thus faces 1342, 1344 extend along the y-direction of film 1300. The height of each prism 1340, that is, the dimension of prism 1340 in the z-direction, is constant along the y-direction and varies along the x-direction. Films 1400 and 1500, of Examples 22 and 23 are similar to Example 21 in this regard.

Figure 27A:
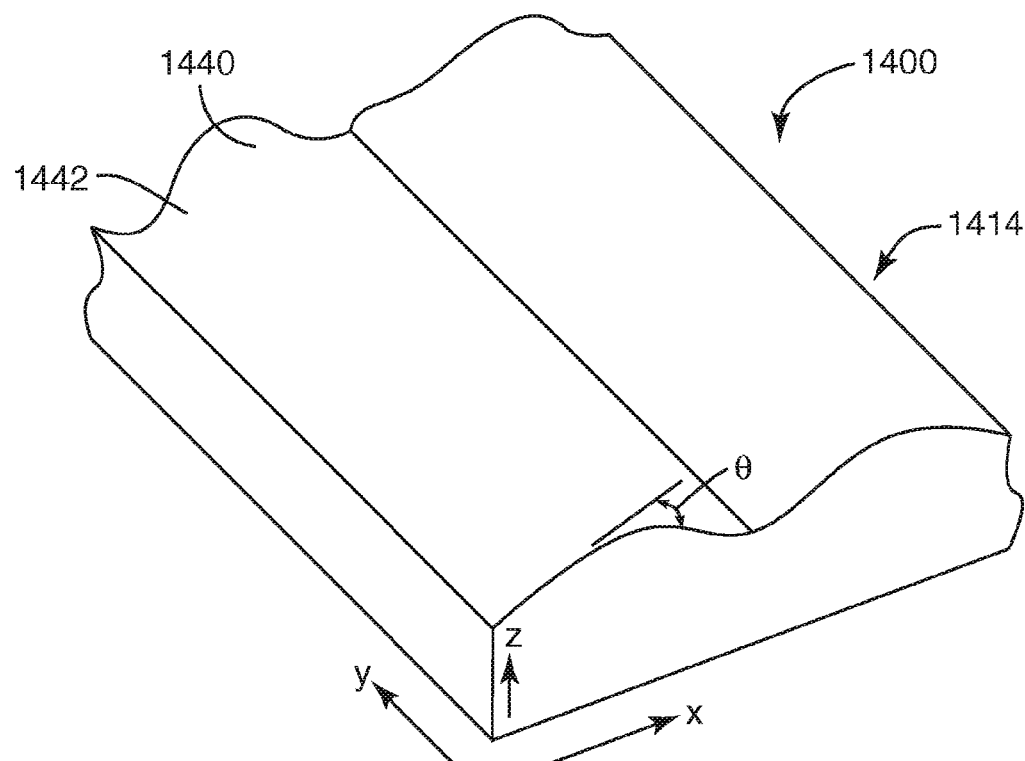
FIG. 27A is a schematic perspective view of a fifteenth embodiment of a light directing film according to the present invention.

Example 22, shown as film 1400 in FIG. 27A, has structured surface 1414 comprising prisms 1440. Prisms 1440 have a prism face 1442. Prisms 1440, and face 1442, extend along the y-direction. Prism faces 1442 form a continuous sine or cosine curve.

Figure 28A:
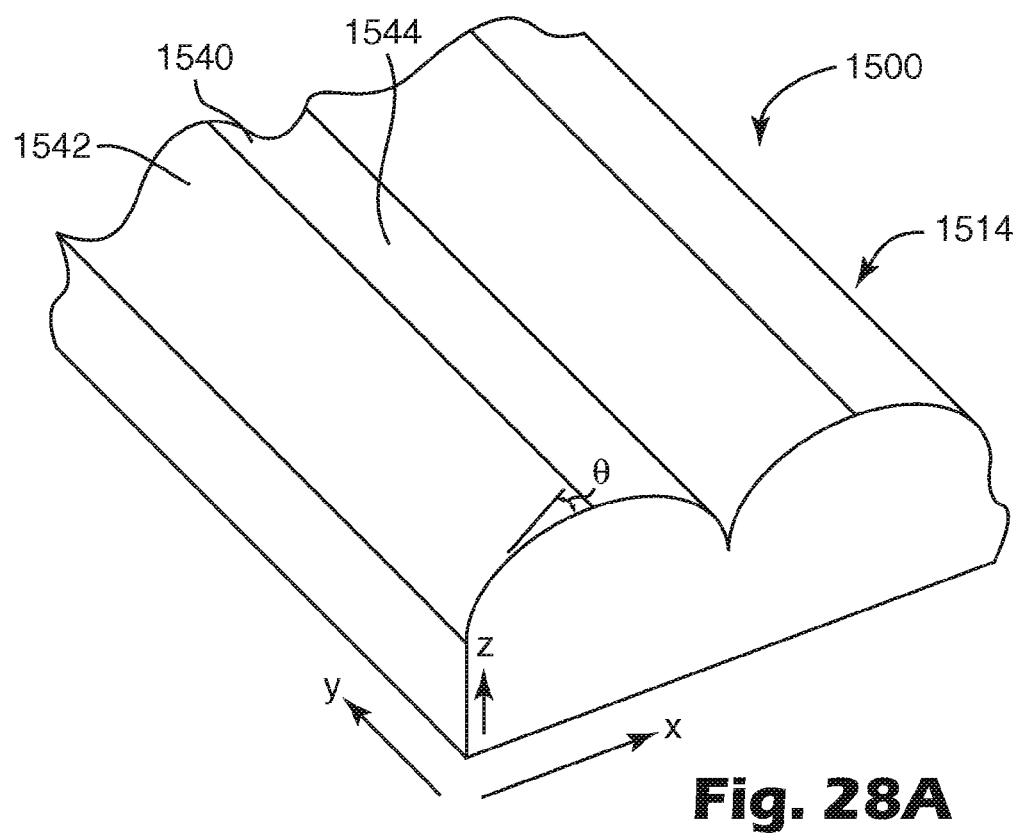
FIG. 28A is a schematic perspective view of a sixteenth embodiment of a light directing film according to the present invention.

Example 23, shown as film 1500 in FIG. 28A, has structured surface 1514 comprising prisms 1540. Prisms 1540 have a first prism face 1542 and a second prism face 1544.

Prisms 1540, and faces 1542, 1544, extend along film 1500 in the y-direction. Prism faces 1542, 1544 are similar to those of Example 20, film 1200, in FIG. 25A, in that they each are a curved arc. Together, faces 1542, 1544 form a two-arc construction.

Figure 26B:
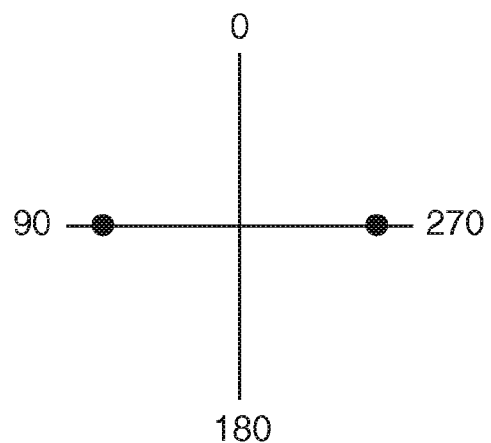
FIG. 26B is a schematic, graphical representation of the reflected light intensity of the light directing film of Example 21 when illuminated with normally incident collimated light.
Figure 27B:
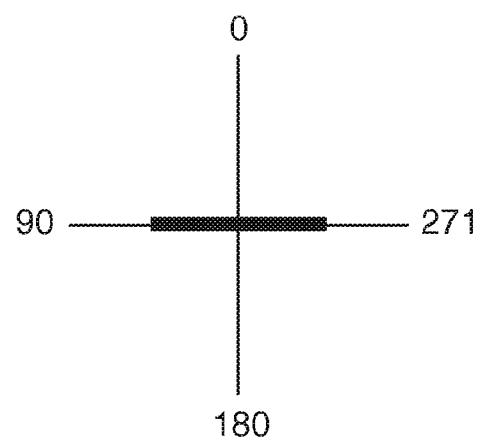
FIG. 27B is a schematic, graphical representation of the reflected light intensity of the light directing film of Example 22 when illuminated with normally incident collimated light.
Figure 28B:
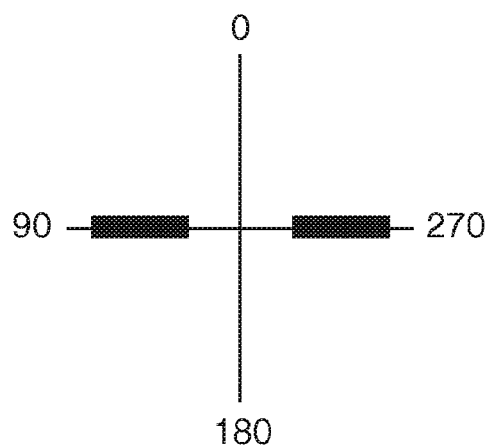
FIG. 28B is a schematic, graphical representation of the reflected light intensity of the light directing film of Example 23 when illuminated with normally incident collimated light.

The expected light reflectance patterns for Examples 21, 22 and 23 are illustrated in FIGS. 26B, 27B, and 28B, respectively.

For Example 21, when illuminated with normally incident collimated light, the reflected light forms a pattern having two symmetric reflectances in the 90-270 azimuth plane, as illustrated in FIG. 26B, at a polar angle of approximately 2nα, where α is the inclination angle of prism faces 1342, 1344 and n is the refractive index of any protective polymer coating. Similar to Example 18 of FIGS. 23A and 23B, light rays reflecting off first prism face 1342 create one of the regions and rays reflecting off the second prism face 1344 create the second region.

If the light rays are reversed, one can see that light incident from directions defined by the reflectance pattern will be reflected in to the normal direction, which is the origin of the polar plot. This shows that some light originating from these oblique regions will be reflected and reach the viewer, usually positioned and observing normal to the surface.

Normally incident collimated light will reflect off of Example 22 in the pattern shown in FIG. 27B. Normally incident collimated light will reflect off of Example 23 in the pattern shown in FIG. 28B. For both Examples 22 and 23, the light patterns are lines along the 90-270 azimuth plane through polar angles 2nθ, where θ is the angle of the tangent to prism face 1442, 1542, 1544, and n is the refractive index of any protective polymer coating. In FIG. 27B, film 1400, with the single arc, is shown as spreading light symmetrically across the center of the plot. For film 1500, FIG. 28B shows the two facet structure providing two discrete lines of light reflection positioned symmetrically around the center of the plot. These patterns are similar to those of Examples 19 and 20 (FIGS. 24B and 25B), except that the patterns are rotated by 90 degrees.

Figure 29A:
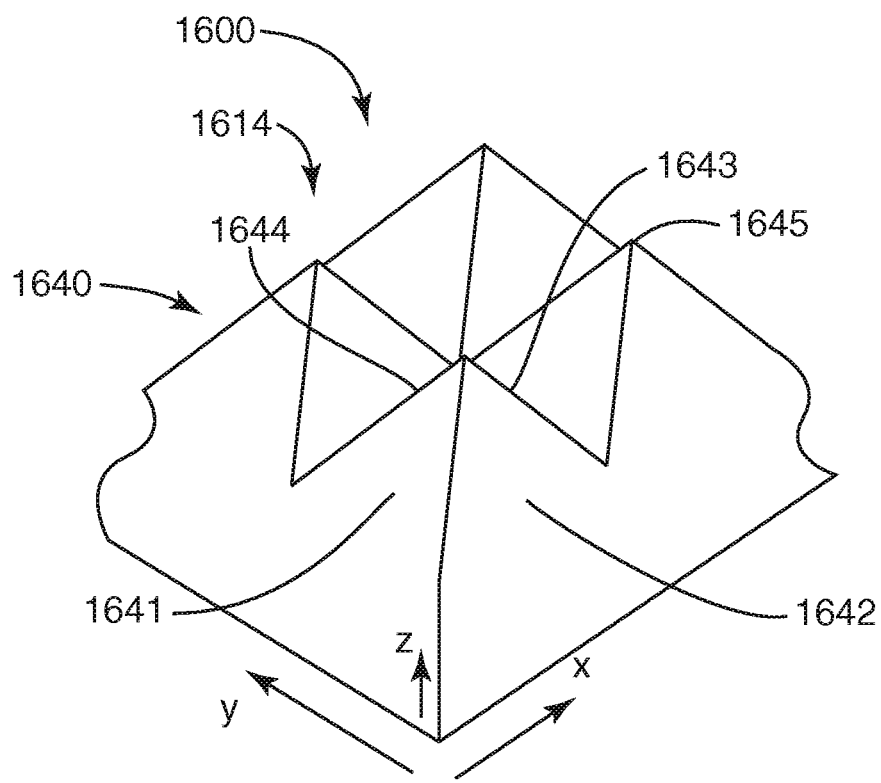
FIG. 29A is a schematic perspective view of a seventeenth embodiment of a light directing film according to the present invention.
Figure 31A:
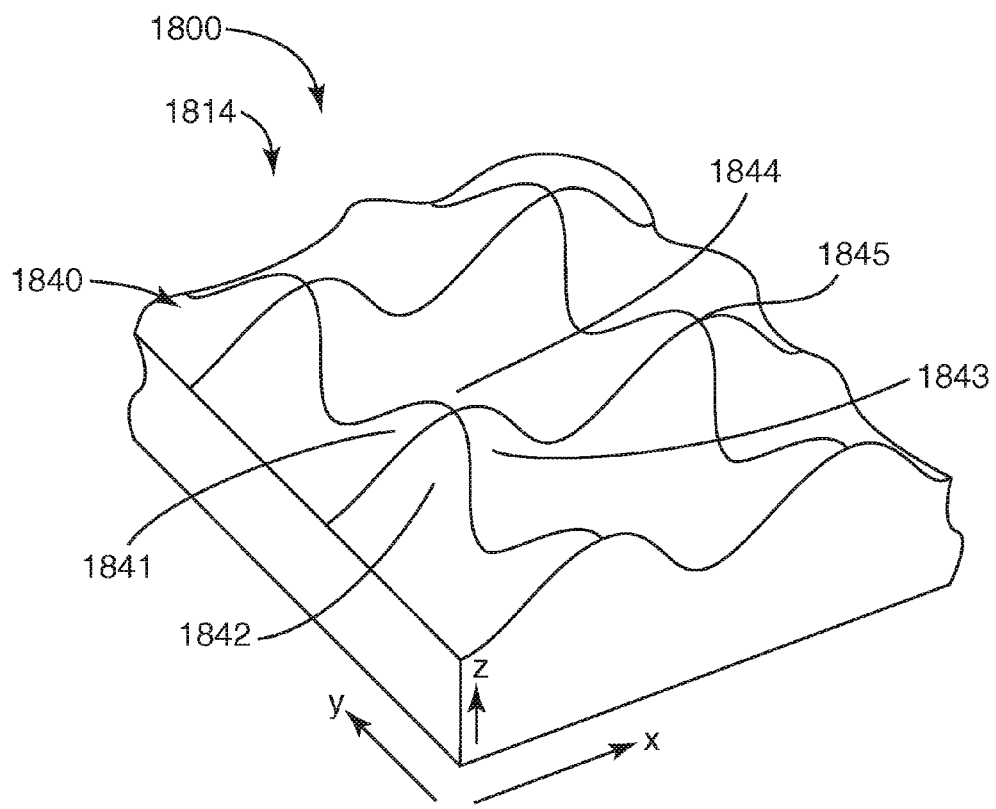
FIG. 31A is a schematic perspective view of a nineteenth embodiment of a light directing film according to the present invention.

Examples 24 through 29 are examples of films having a plurality of pyramidal prisms, where the height of the prisms varies, in the z-direction, along both the x-direction and the y-direction. Examples 24 and 25 are illustrated in FIGS. 29A, 30A, respectively, as films 1600 and 1700. Example 27 is illustrated in FIG. 31A as film 1800. Each of films 1600, 1700, 1800 has a structured surface 1614, 1714, 1814 that comprises a plurality of pyramidal prisms 1640, 1740, 1840.

Figure 29B:
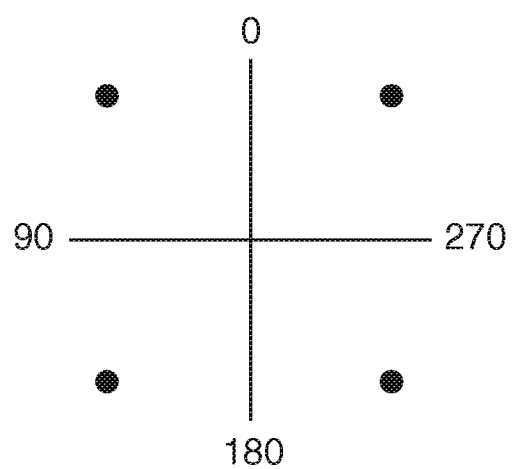
FIG. 29B is a schematic, graphical representation of the reflected light intensity of the light directing film of Example 24 when illuminated with normally incident collimated light.

For Example 24, prisms 1640 are symmetric, isosceles prisms having straight faces in both the XZ and YZ planes. Each prism 1640 has a first face 1641, a second face 1642, a third face 1643 and a fourth face 1644. The four faces meet at apex 1645. The expected resulting pattern of reflected light is shown in FIG. 29B. When film 1600 is exposed to collimated normally incident light, the light is split into four directions, and four discrete regions of reflectances are formed, one in each quadrant of the polar plot. The four reflectances are fairly condensed, because the source lighting was normally incident collimated light, and appear as a spot or point on the polar plot.

For Example 25 in FIG. 30A, prisms 1740 are symmetrical, four sided prisms having curved or arced faces in both the XZ and YZ planes. Prisms 1740 have four faces, 1741, 1742, 1743, 1744, which meet at apex 1745. Apex 1745 is not a sharp peak as is apex 1645 from film 1600 of Example 24; rather, apex 1745 has a fairly rounded surface, formed by the intersection of arc curves extending in both the x-direction and the y-direction. When collimated normally incident light is provided on film 1700, the light is split into four directions, and four discrete regions of reflectances, each shaped approximately as a square, are formed; see FIG. 30B. The square or rectangular regions of reflected light are caused by the four distinct, curved prism faces 1741, 1742, 1743, 1744 which form the repeat cell.

If the light rays are reversed, one can see that light incident from directions defined by the reflectance pattern will be reflected in to the normal direction, which is the origin of the polar plot. This shows that some light originating from these oblique regions will be reflected and reach the viewer, usually positioned and observing normal to the surface.

Example 26 includes a volume diffuser positioned over the light directing film of Example 25. The expected light reflectance pattern is illustrated in FIG. 30C. Example 26, which includes the volume diffuser, has a broader light reflectance having less sharp edges than Example 25, which does not include a volume diffuser. The light reflectance is further dispersed than the reflectance from Example 25, yet still retains the 4-fold symmetry.

When manufacturing the light directing film of Examples 25 and 26, pyramidal prisms, alternating as being cut into or raised out from the surface, can be cut along the x-direction. The intersection line between the two pyramids has a continuous slope. "Cut into" means that the pyramid becomes a well or negative of the positive raised pyramid.

Film 1800 of Example 27, illustrated in FIG. 31A, is similar to film 1700 of FIG. 30A in that film 1800 has symmetrical, four sided prisms having curved or arced faces in both the XZ and YZ planes. Prisms 1840 have four faces 1841, 1842, 1843, 1844 which meet at apex 1845. Apex 1845 is not a sharp peak but has a fairly rounded surface, formed by the intersection of arc curves extending in both the x-direction and the y-direction. Prisms 1840 are formed by combinations of cosine curves, single arc curves, and double arc curves. Extending along the y-direction (in the YZ plane), prisms 1840 are defined by a curve composed of alternating single arc sections and double arc sections. Double arc sections are two single arcs that meet at an apex forming a discontinuous slope. Alternating single arc and double arc sections defining the Y-axis cross-section can be cut using two distinct diamond bits either in two separate cutting passes or with a single cutting pass and two FTS stages driven simultaneously with different waveforms. Both cosine curves and double arc section curves extend, in an alternating fashion, along the x-axis in the x-direction. That is, as shown in FIG. 31A, a cosine curve is the frontmost curve; the next curve back comprises double-arc sections; the third curve back is again a cosine curve, and so on. The peaks or apexes of the y-direction composite curve intersect with the peaks or apexes of the x-direction composite curve, so that the apexes or peaks form apex 1845 of prism 1840. Alternating pyramidal prisms in the x-direction can be cut into or raised out of the tool, as described in Examples 25 and 26, above. The reflected light patterns from the "in" or "out" prisms are the same. FIG. 31A shows four repeat cells.

In Example 27, double arc sections could be replaced by a curve having a discontinuous slope at the peak. An example of such a curve is a cosine curve from which a symmetric section, such as 20 degrees on either side of zero, is removed. Similarly, the continuous FTS cosine curve could be replaced by another continuous curve such as the alternating in/out circle arcs of FIG. 18.

Figure 31B:
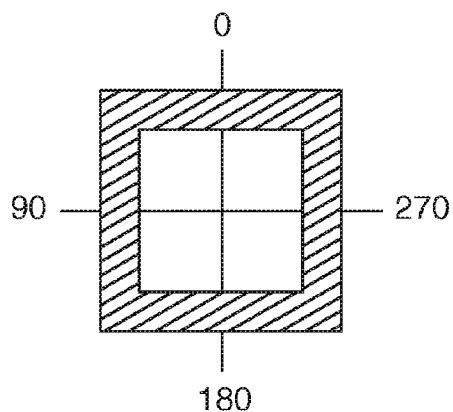
FIG. 31B is a schematic, graphical representation of the reflected light intensity of the light directing film of Example 27 when illuminated with normally incident collimated light.

When collimated normally incident light is reflected off film 1800, the light is split four directions, and four rectangular shaped regions of reflectance are obtained, as illustrated in FIG. 31B, which together define a hollow or annular square reflectance pattern that is continuous through the four quadrants, creating 4-fold rotational symmetry.

If the light rays are reversed, one can see that light incident from directions defined by the reflectance pattern will be reflected in to the normal direction, which is the origin of the polar plot. This shows that some light originating from these oblique regions will be reflected and reach the viewer, usually positioned and observing normal to the surface.

Figure 31C:
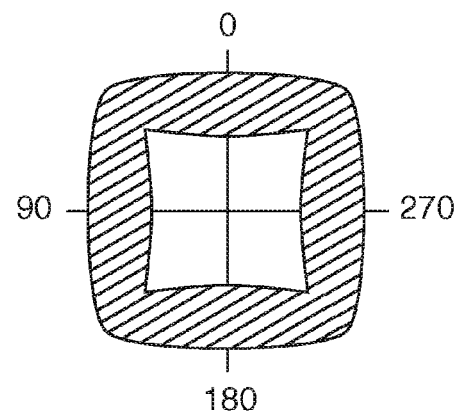
FIG. 31C is a schematic, graphical representation of the reflected light intensity of the light directing film of Example 28 when illuminated with normally incident collimated light.

Example 28 includes a volume diffuser over the light directing film of Example 27. The expected light reflectance pattern is illustrated in FIG. 31C. Example 28, which includes the volume diffuser, has a broader light reflectance having less sharp edges than Example 27, which does not include a volume diffuser. The reflectance from Example 28 is more dispersed than that of Example 27, but retains its rotational symmetry.

Rotationally symmetric light directing films, such as film 1800 with or without the volume diffuser, are desired because of their reduced sensitivity to orientation of the film in a light directing display. For example, light directing film 1800 could be rotated (or misaligned) by, for example, 20 degrees, from the optimum orientation angle on a light directing display, without compromising lighting quality and that flexibility overlays an additional 4-fold orientational symmetry.

In Examples 27 and 28 the hollow or annular shape of the reflected light pattern and its 4-fold rotational symmetry is due to the particular selective use of continuous and discontinuous slopes. More complex patterns such as n-fold rotational symmetries or multiple enclosed dark regions could be envisioned given more complicated tool structures.

Figure 32A:
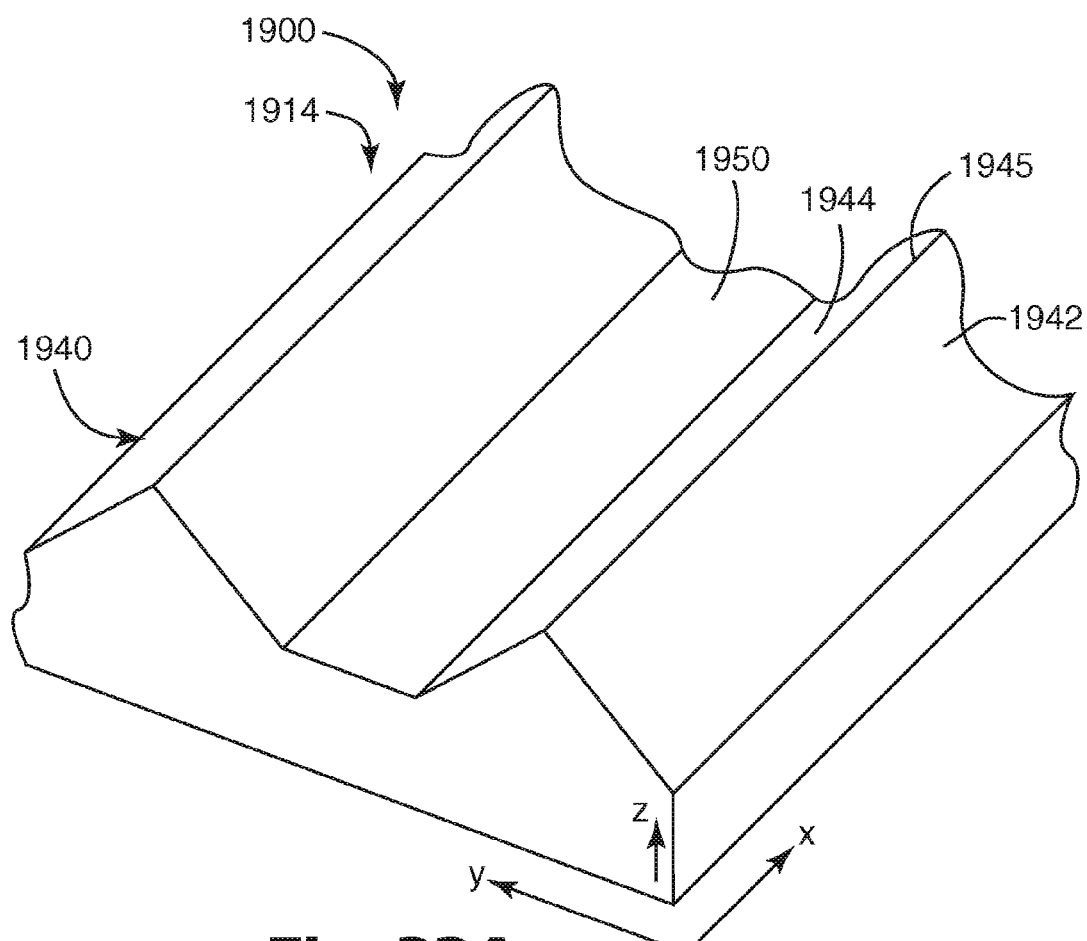
FIG. 32A is a schematic perspective view of a twentieth embodiment of a light directing film according to the present invention.

Referring now to FIG. 32A, light directing film 1900, Example 29, is illustrated. Film 1900 has a structured surface 1914 made up of prisms 1940 separated by gap 1950. Prisms 1940 have a first face 1942 and a second face 1944. Faces 1942, 1944 intersect at ridge peak 1945.

Figure 32B:
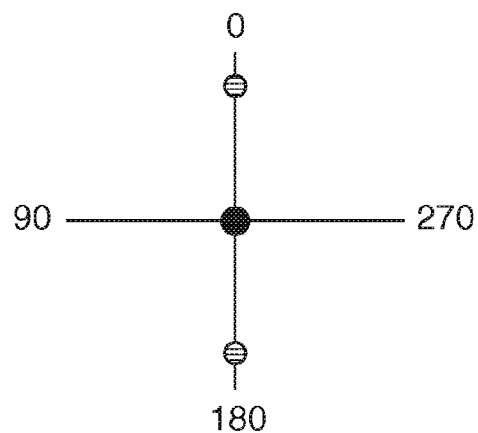
FIG. 32B is a schematic, graphical representation of the reflected light intensity of the light directing film of Example 29 when illuminated with normally incident collimated light.

The reflected light pattern of Example 29 is similar to that of Example 18 of FIGS. 23A and 23B, with two symmetric reflectances in the 0-180 azimuth plane. However, Example 29 also includes a central reflectance region, positioned at the center of the plot, caused by reflection off gaps 1950. One could invision a series of complex patterns formed from the basis of a three-facet structure such as Example 29, in the same manner that Example 28 was built off of two-facet structure of Example 18 (FIGS. 23A and 32B).

It is understood that each of Examples 18-29 could include FTS noise superimposed over the base prismatic structure to provide cosmetic defect hiding and additional diffusion.

The present invention should not be considered limited to the particular examples described above, but rather should be understood to cover all aspects of the invention as set out in the attached claims. Various modifications, equivalent processes, as well as numerous structures and constructions to which the present invention may be applicable will be readily apparent to those of skill in the art upon review of the present specification. The claims are intended to cover such modifications and devices.

What is claimed is:

1. A light directing film comprising a reflective structured surface having a plurality of discrete reflective structures, each discrete reflective structure having at least four reflective sides meeting at an apex, at least one reflective side of each discrete reflective structure being a nonlinear surface, wherein a reflected light intensity profile of the light directing film for an incident collimated light has at least four discrete regions, at least one of the at least four discrete regions having a substantially flat top.

2. The light directing film according to claim 1, wherein the at least one reflective side that has a nonlinear surface, has a curved surface.

3. The light directing film according to claim 1, wherein the apex of at least one discrete reflective structure is a rounded surface.

* * * * *